US007278106B1

(12) United States Patent
Mason

(10) Patent No.: US 7,278,106 B1
(45) Date of Patent: Oct. 2, 2007

(54) METHOD AND APPARATUS FOR INTERACTING WITH A SOURCE CODE CONTROL SYSTEM

(75) Inventor: Matthew J. Mason, Santa Barbara, CA (US)

(73) Assignee: Computer Associates Think, Inc., Islandia, NY (US)

( * ) Notice: Subject to any disclaimer, the term of this patent is extended or adjusted under 35 U.S.C. 154(b) by 121 days.

(21) Appl. No.: 09/115,273

(22) Filed: Jul. 14, 1998

(51) Int. Cl.
*G06F 15/00* (2006.01)
*G06F 13/00* (2006.01)
(52) U.S. Cl. ..................... 715/744; 715/733
(58) Field of Classification Search ............... 345/762, 345/765, 744, 848, 853; 715/762, 765, 744, 715/848, 853, 763, 777, 738, 740, 733, 737; 709/220, 221, 223, 202, 218, 205, 226
See application file for complete search history.

(56) References Cited

U.S. PATENT DOCUMENTS

| 5,325,533 | A | | 6/1994 | McInerney et al. ......... 395/700 |
|---|---|---|---|---|
| 5,452,415 | A | | 9/1995 | Hotka |
| 5,675,802 | A | * | 10/1997 | Allen et al. ................ 395/703 |
| 5,774,689 | A | * | 6/1998 | Curtis et al. ................ 395/500 |
| 5,805,889 | A | * | 9/1998 | Van De Vanter ............ 395/703 |
| 5,819,042 | A | * | 10/1998 | Hansen .................. 395/200.52 |
| 5,910,803 | A | * | 6/1999 | Grau et al. ................. 345/853 |
| 5,999,179 | A | * | 12/1999 | Kekic et al. ................ 345/349 |
| 6,105,027 | A | * | 8/2000 | Schneider et al. .......... 709/205 |
| 6,237,092 | B1 | * | 5/2001 | Hayes, Jr. ................... 709/220 |
| 6,339,826 | B2 | * | 1/2002 | Hayes, Jr. et al. .......... 709/226 |
| 6,389,464 | B1 | * | 5/2002 | Krishnamurthy et al. ... 709/220 |
| 6,496,208 | B1 | * | 12/2002 | Bernhardt et al. .......... 345/853 |

OTHER PUBLICATIONS

Gavron, Jacquelyn and Moran, Joseph, How to Use Windows NT 4 Workstation, Ziff-Davis, pp. 28-30, 34-40, 117-120, 1996.*
Microsoft Corporation, *Introducing Windows 95*, 1981-1995, entire document, and p. 22.
Continuus, Continuus/CM UNIX, date unnknown, screen shot (FIG 1A).
Continuus, Continuus/CM windows, date unknown, screen shot (FIG 1B).
Pure Atria, Clear Case, date unknown, screen shot (FIG 1C).
Kramer et al., "Graphical Configuration Programming," IEEE XP000072735, pp. 53-65, 1989.
Gavron et al, "How to Use Microsoft Windows NT 4 Workstation," Ziff-Davis, pp. 28-29, 34-40, and 117-120 plus cover page, 1996.

(Continued)

*Primary Examiner*—Cao (Kevin) Nguyen
(74) *Attorney, Agent, or Firm*—Baker Botts L.L.P.

(57) ABSTRACT

A configuration management system having configuration management functions accessible from an Explorer style interface including a tree view listing of objects within the configuration management system and a list view of components and relationships associated with an object selected from the tree view listing. The interface allows for configuration management functions to be invoked via drag and drop procedures alone, from specialized menus, including pull down and right click windows and pages, and from a combination of drag and drop and menus. A report generator provides for various reports based on selected object types. A web interface allows for configuration management functions to be performed across a network and allow multiple platform access to a single server.

24 Claims, 40 Drawing Sheets

OTHER PUBLICATIONS

Reuter et al., "Distributed Revision Control Via the World Wide Web," University of Karlsrube, Karlsrube, Germany, XP000617828, pp. 166-174, 1997.
"Microsoft Visual InterDev 1.0 Strategic Whitepaper," Microsoft Corporation, http://msdn.microsoft.com/library/en~us/dnvid/html/msdn_vidwp.asp?frame=true, 26 pages, Mar. 1997.
Loques et al., "P-RIO: A Modular Parallel-Programming Environment," IEEE, XP-000737884, pp. 47-56, Jan.-Mar. 1998.
PCT Search Report for PCT/US99/15826, 6 pages, Oct. 22, 1999.
EPO Communication for Ref. No. 99935538.1 (PCT/, Application No. 99935538.1-2201-US9915826, 3 pages, Jun. 3, 2002.
EPO Communication pursuant to Article 96(2) EPC, Application No. 99 935 538.1—2211, 5 pages, Jul. 4, 2006.
EPO Communication pursuant to Article 96(2) EPC, Application No. 99 935 538.1—2211, 4 pages, Nov. 27, 2006.

\* cited by examiner

Control Problem Task Rebona

Continue(Project View)- alexi 4Dp2

Project: co,alexi_cex?  ☐ Rule: beurbuger:  Help

| Name | | | | Version | Owner | Status | Type |
|---|---|---|---|---|---|---|---|
| co | | | | alex_dir | alexi | working | project |
| co | | | | 3 | alexi | working | dir |
| | Yolib | | | | | | rdeflect |
| | icc | | | 3 | alexi | working | executable |
| | includes | | | 1 | alexi | working | dr |
| | erti | | | | alexi | released | dr |
| | src | | | | alexi | released | dr |
| | | bucokr.c | | 2.1 | alexi | released | csrc |
| | | clee.c | | | alexi | integrated | csrc |
| | | cohene.c | | | alexi | released | csrc |
| | | consat.c | | | alexi | released | csrc |
| | | display.c | | 2.1 | alexi | influen | cxir |
| | | ___.c | | | alexi | released | csrc |
| | | drawtft.c | | 3 | | integrated | csrc |
| | | format.c | | | | released | csrc |
| | | grie.c | | 3 | | working | csrc |
| | | b5.87 | | | | | |

Object Menu
Edit Info...
Show History...
Check Out...
Check In...
Print
Find User\
Use...
Unuse...
Make...

*FIG. 1A* (PRIOR ART)

| Parallel Development Model\Assigned Changes | |
|---|---|
| Name | Data |
| 📁 Forms | |
| 📁 Package G... | |
| 📁 Versions | |
| 🔗 Create Time | 07/30/1997:21:16:58 |
| 🔒 Creator | harvest |
| 📄 Description | |
| Environment | Parallel Development M |
| 🔗 Last Modifi... | 07/30/1997:21:16:58 |
| 🔒 Modifier | |
| Name | Bug#-570 |
| 📄 Note | |
| State | Assigned Changes |
| 👓 View | No View |

FIG. 4

| Properties |
|---|
| Rename |
| Process-48<br>Checkout coding<br>Change request<br>Promote to test<br>Approve promote test<br>Delete Versions<br>Concurrent merge<br>Interactive merge<br>List Versions<br>Random list difference<br>Take Snapshot |

*FIG. 8A*

| Harvest Documentaiton\Working\Help Items | | | | | | | |
|---|---|---|---|---|---|---|---|
| Name | Path | Version | Package | Status | Size | User | File Date/Time |
| 101CLOSE... | Harvest_D... | | Help Ite... | Reser... | | Olin... | 02/23/1998:20:2... |
| 102CLOSE... | Harvest_D... | | Help Ite... | Reser... | | Olin... | 02/23/1998:20:3... |
| 110 CLOSE... | Harvest_D... | | Help Ite... | Reser... | | Olin... | 02/23/1998:20:4... |
| ALL.BMP | Harvest_D... | 1 | Help Ite... | Remo... | | Gina... | 02/23/1998:21:1... |
| CMCHECK... | Harvest_D... | | Help Ite... | Reser... | | Olin... | 02/23/1998:20:2... |
| D_event_lis... | Harvest_D... | 2 | Help Ite... | Remo... | | Gina... | 02/23/1998:21:1... |
| d_example... | Harvest_D... | 1 | Help Ite... | Remo... | | Gina... | 02/23/1998:21:1... |
| d_example... | Harvest_D... | 1 | Help Ite... | Remo... | | Gina... | 02/23/1998:21:1... |
| d_example... | Harvest_D... | 1 | Help Ite... | Remo... | | Gina... | 02/23/1998:21:1... |

*FIG. 11*

```
┌─────────────────────────────────────────────────────────┬──────────────┐
│ Form Editor-"Comment"-View Only                         │ _ □ ×        │
├─────────────────────────────────────────────────────────┼──────────────┤
│ Name: [CR-0004                              ]           │   Apply      │
│                                                         ├──────────────┤
│ Commented By [frankn    ] Date: [Thu Aug 22,]           │   Cancel     │
│ Comments:                                               ├──────────────┤
│ ┌─────────────────────────────────────────────────┬─▲─┐ │   Save       │
│ │Make sure that you coordinate changes make for   │   │ ├──────────────┤
│ │this fix with those made for CR-0002, which      │   │ │   Help       │
│ │impact the same code.                            │   │ ├──────────────┤
│ │See the design document in O:/Shared/Dev/Docs    │   │ │  Access...   │
│ │for a detailed description of how these two      │   │ ├──────────────┤
│ │fixes should work together.                      │   │ │ Assoc Forms..│
│ │                                                 │   │ ├──────────────┤
│ │                                                 │   │ │Assoc Packages│
│ │                                                 │   │ ├──────────────┤
│ │                                                 │   │ │  History...  │
│ │                                                 ├─▼─┤ ├──────────────┤
│ └─────────────────────────────────────────────────┴───┘ │    Edit      │
│ Keyword [CR-0002                                      ] │              │
└─────────────────────────────────────────────────────────┴──────────────┘
```

Form Editor—"Problem Report"–View Only

Name: Bug: performance

Report Information | Application Information | Problem Information

Date Reported: Thu Aug 22, 1996
Reported By: frankn
Category: bug

Apply
Cancel
Save
Help
Access...
Assoc Forms...
Assoc Packages...
History...
Edit

| Form Editor—"Q and A"—View Only | | |
|---|---|---|
| Name: Version inquiry | | Apply |
| Question | | Cancel |
| Submitted By: Paul B  Date: Thu Aug 22, | | Save |
| What release of the file update routine itinalized | | Help |
| Keyword: keyword | | Access... |
| | | Assoc Forms... |
| Answer | | Assoc Packages... |
| Answered By: Frank  Date: Thu Aug 22, | | History... |
| This feature was introduced in release 1.3. | | Edit |

*FIG. 36E*

Form Editor—"Testing Info"—View Only

Name: Testing: CR-0004

Development Information
Developer: frank Date: Thu Aug 22, 1

Test Cases:
Test cases for this change can be found at
O:\Shared\Dev\Testing

Developer Comments:
Make sure that you run this test from an empty directory, or results may be unpredictable.

Testing Information
Tester: susan Date: Fri Aug 23, 1996

Summary of Test Results:
I rebuilt the executable with Frank's changes and re-ran his test cases. Everything seemed to execute fine, but I am concerned about memory usage.

Test Comments:
I recomment running the performance test tools when all of the associated packages are complete to analyze the performance problems.

Buttons: Apply, Cancel, Save, Help, Access..., Assoc Forms..., Assoc Packages..., History..., Edit

METHOD AND APPARATUS FOR INTERACTING WITH A SOURCE CODE CONTROL SYSTEM

BACKGROUND OF THE INVENTION

1. Field of the Invention

This invention relates to configuration management systems. The invention is more particularly related to methods and apparatus for invoking configuration management functions and displaying objects in the configuration management system. The invention is still further particularly related to a method and apparatus for interacting with a configuration management system where that interaction is controlled and displayed via a Windows 95 Explorer style interface.

2. Discussion of the Background

Configuration management systems are generally known in the art and generally encompass methods and tools for systematically managing configuration of systems throughout development and maintenance life cycles of the system. Configuration management applies to the development of software, software modules in a software system, and in the development of hardware and related components.

Configuration management applies anytime a product with one or more components or one or more versions is produced. Typical problems encountered that lead to the need of configuration management systems include access to various versions of a particular product under development or at any time in the product's life cycle, traceability of requirements, traceability of component versions utilized in producing a build, management of changes throughout the development and life cycles, and regression allowing production of an earlier produced version of a product.

Because of the complexity in performing all the configuration management functions appropriate in the production of a modern product, automated tools are available to assist in the configuration management functions. Currently available tools include Continuus/CM and Pure Atria's ClearCase. A screen shot of the Continuus/CM is shown in FIG. 1A. The Continuus/CM has a UNIX look and feel and provides a user access to configuration management functions to items displayed in the project list. However, the UNIX look and feel is neither intuitive nor easy to use, thereby making it difficult for users to learn the system and provide efficient configuration management of the items under configuration control.

FIG. 1B illustrates the Continuus/CM in a Windows environment, specifically a properties of tasks window. Continuus/CM in Windows is that found in the UNIX environment, but is still somewhat specialized and lacking in intuitive ease of use.

FIG. 1C is a screen snapshot of Pure Atria's ClearCase version 3.1. ClearCase V. 3.1 has the following features, 1) a Windows oriented application having minimal Explorer type functionality that shows information about files and directories within a ClearCase view. The information provided in ClearCase includes checked out state, version of the element that the view selects, and rule in the configuration specification that selected the version.

However, neither of these systems have a particularly easy or intuitive to use interface. With the increased complexity of modern products including multiple versions of subsystems including both hardware and software, an easy to use and intuitive configuration management interface is highly desired. According to a recent analysis by the Chicago Interface Group (http://www.cigi.net), one of two major deficiencies in configuration management systems is that "the user interface is tedious and cumbersome."

SUMMARY OF THE INVENTION

Accordingly, it is an object of this invention to provide an intuitive and easy to use interface for a configuration management system.

It is another object of this invention to provide an interface to a configuration management system utilizing a fully functional Explorer-like interface having search tools, a split screen including a tree view of all objects in the configuration management system.

It is yet another object of the present invention to support full drag and drop functionality both inside the configuration management system, from search engines, and into other applications like the Windows NT/95 Explorer.

It is still yet another object of the present invention to provide additional functionality not found in modern configuration management tools to increase the efficiency of operating the configuration management interface.

These and other objects are accomplished by a configuration management system including a configuration device configured to perform configuration management functions on objects within the configuration management system, and a display device configured to display a representation of the objects in a Windows 95 Explorer style presentation. The representation of the data objects includes a tree view listing of all objects within the configuration management system, and a list view displaying contents and relationships thereof of a selected one of said objects listed in the tree view listing. The present invention provides a listing of all objects within the configuration management system and not just files.

The present invention also includes the ability to utilize full drag and drop functionality both within the configuration management system for the invocation of configuration management functions, and drag and drop functionality between the configuration management system and other applications such as the Windows 95/NT Explorer. The present invention also includes the ability to create shortcuts directly into specific contexts within the configuration management system, and the ability to right click and obtain properties of selected objects or open a selected object via a registered application for a file type of the object selected. In addition, the right click may be used on a version to invoke a checkout function of the version into a temporary directory and invoke the registered application to execute in conjunction with the checked out version.

The present invention also includes the ability to generate one of access reports, version control reports, and package based reports based on a type of a selected object in the configuration management system.

In an alternative configuration, the configuration management system includes a server for transmitting information produced by the configuration device over a network for display on a remote computer. In one embodiment, the network is one of the Internet and an intranet and the transmitted information is formatted as one of an HTML document or as consistent with any of the known programming languages, components, or applets used for transmitting information over such networks.

In sum, the present invention depicts objects and their relationships and provides access to day-to-day configuration management functions. For example, developers are able to obtain version information, check items out for modification and check in modified files. Packages may be promoted and demoted in the life cycle. Various forms can be edited and associated with packages within the system. Each of the above functions are provided in an intuitively organized and easily learned program interface as will be described in greater detail hereinbelow.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A is a screen snapshot of a Project View in UNIX based Continuus/CM;

FIG. 4 is a screen snapshot of a Harvest Explorer List View Pane;

FIG. 8A is a screen shot of a Harvest Explorer right click pop up menu;

FIG. 11 is a screen snapshot of a Harvest Explorer list view and expanded versions folder;

FIG. 36A is a screen snapshot of a Harvest Explorer Form Editor Comment window;

FIG. 36B is a screen snapshot of a Harvest Explorer Form Editor Defect Tracking window;

FIG. 36C is a screen snapshot of a Harvest Explorer Form Editor Modification Request window;

FIG. 36D is a screen snapshot of a Harvest Explorer Form Editor Problem Report window;

FIG. 36E is a screen snapshot of a Harvest Explorer Form Editor Q and A window;

FIG. 36F is a screen snapshot of a Harvest Explorer Form Editor Testing Info window;

FIG. 36G is a screen snapshot of a Harvest Explorer Form Editor User Contact window;

FIG. 36H is a screen snapshot of a Harvest Explorer Form Editor Application Change Request window; and FIG. 36I is a screen snapshot of a Harvest Explorer Form Editor ESD Change Request window.

DESCRIPTION OF THE PREFERRED EMBODIMENTS

Figure 1B:
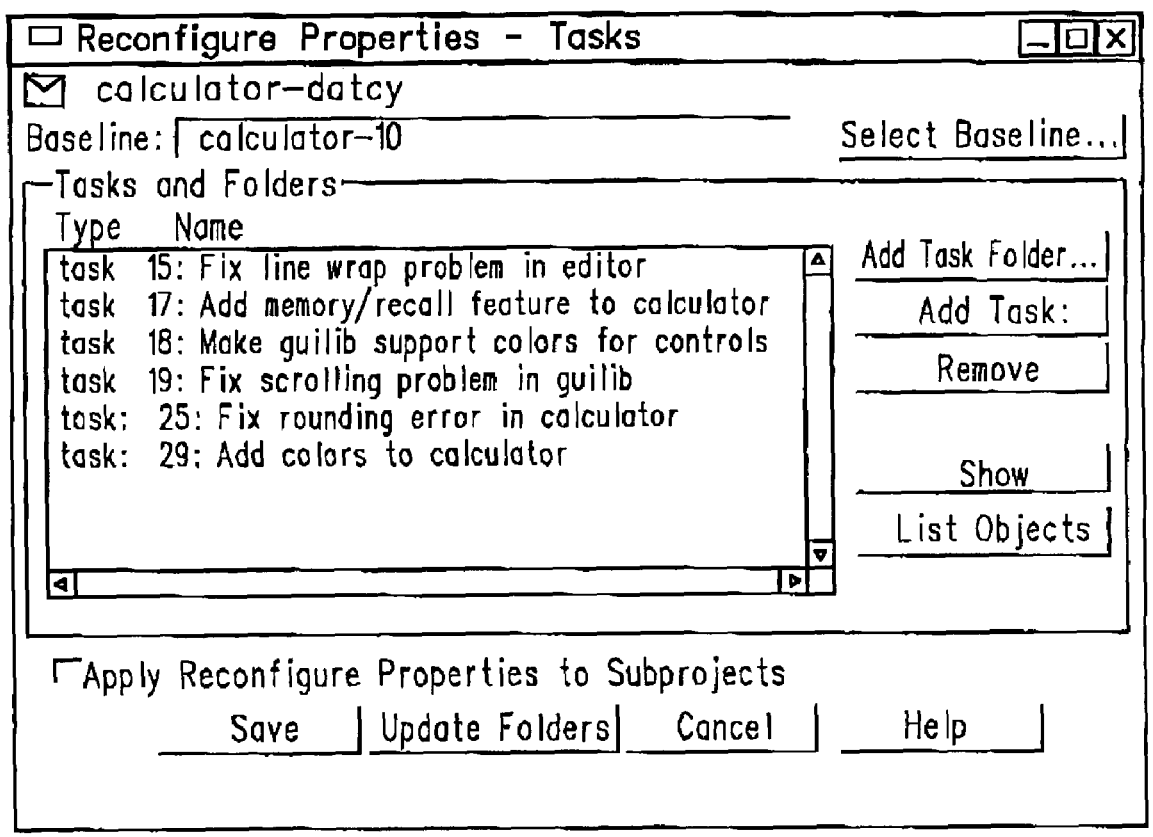
FIG. 1B is a screen snapshot of a Properties of Tasks view in Windows based Continuus/CM.
Figure 1C:
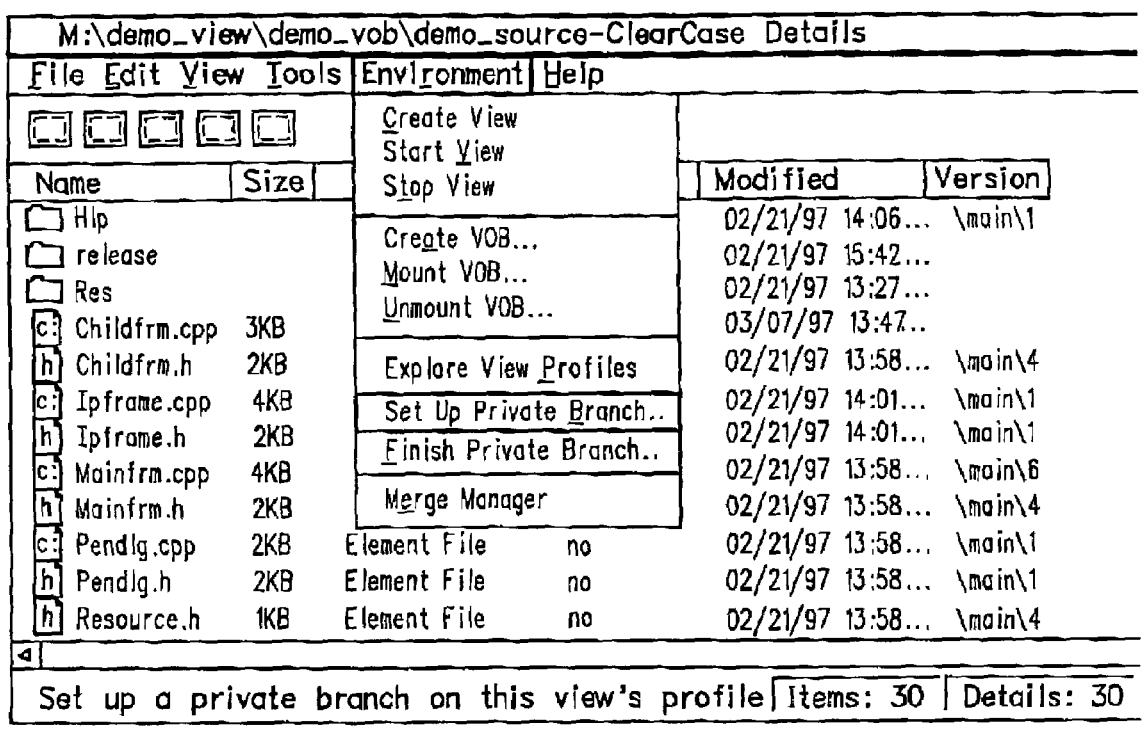
FIG. 1C is a screen snapshot of a ClearCase configuration management tool.
Figure 2:
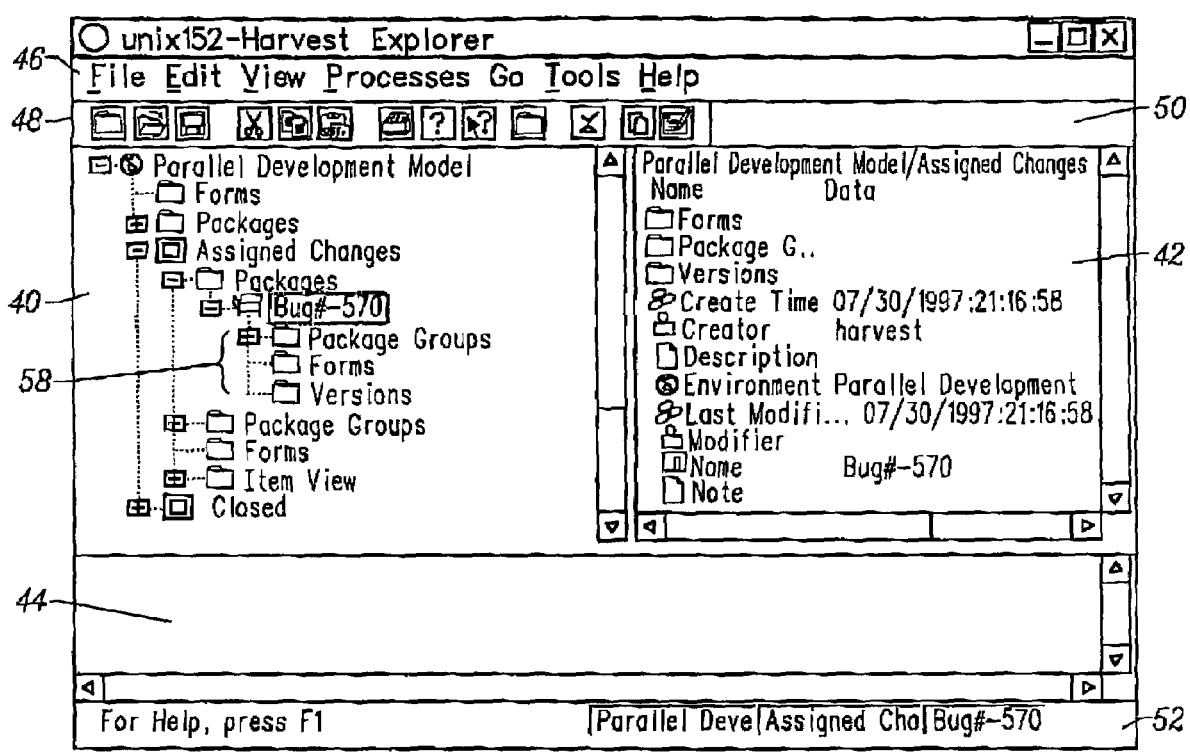
FIG. 2 is a screen snapshot of Harvest Explorer and Harvest Object Relationships.

Referring now to the drawings, wherein like reference numerals designate identical or corresponding parts throughout the several views, and more particularly to FIG. 2 thereof, there is illustrated a screen snapshot of the user interface of the present invention (hereinafter referred to as Harvest Explorer, Harvest being an underlying configuration management system and Harvest Explorer being the user interface). The Harvest Explorer screen is divided into three panes: the tree view 40, the list view 42, and the optional log view 44. A menu bar 46 at the top of the screen, and a tool bar 48 below the menu bar, provide two methods for executing functions. All configuration management functions can be found on the menu bar, and most configuration management functions are available from the tool bar. A description bar 50 at the top of list view pane shows the current view path (also referred to as a context). A status bar 52 across the bottom of the screen describes the current action, environment, state, and object.

The tree view 40 displays Harvest objects, which include environments, states, forms, items, versions, package groups, packages, and depicts their relationships. Selecting objects in the tree view sets a context (current view path) to perform various configuration management functions.

Figure 3:
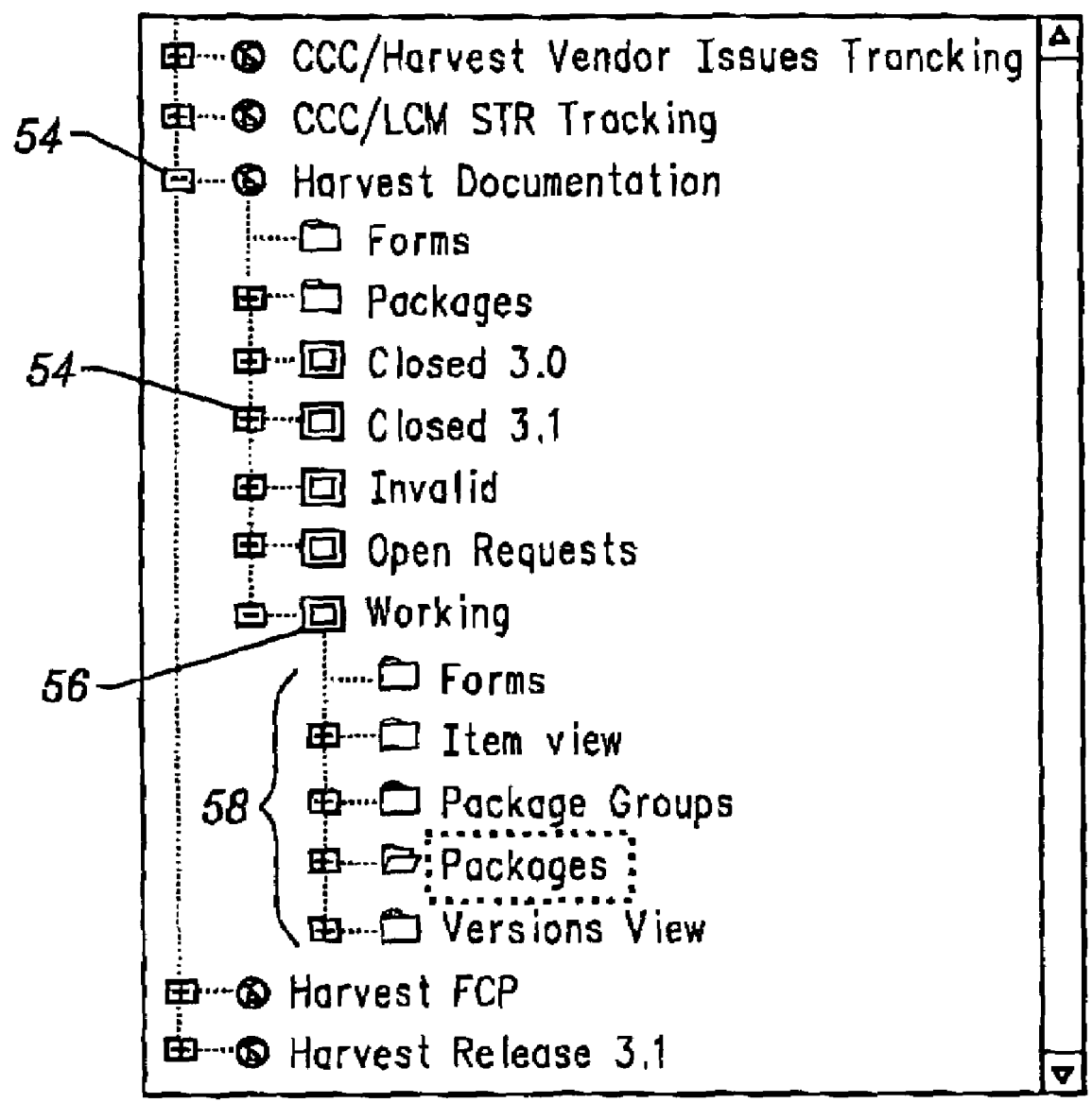
FIG. 3 is a screen snapshot of a Harvest Explorer Tree View Pane.

A close up of the tree view pane is shown in FIG. 3. The tree view includes node expansion buttons (54 for example) that enable expansion or collapsing of a selected object's contents, but does not set the context. When an object is expanded, the plus sign changes to a minus sign. When there are no contents to be listed, the node expansion button does not display.

A single left click on an object icon (56 for example) in the tree view sets the context and lists the contents of that object directly beneath the object (contents of object working 56, shown as 58, for example). Double clicking on an object expands the object to display its contents beneath the object in the tree view (as in 58 described above) and the list view 42, and sets the context.

The list view 42 is the right pane of the Harvest Explorer and is shown in FIG. 4. The list view pane displays the contents of the selected object or folder and depicts their relationships (for example contents of object folder BUG #-570 is displayed in the list view 42). Four styles are available for displaying objects in including large icons, small icons, list, and details, the style being selected by choosing an appropriate selection from the view menu. Descriptions of objects can be listed in sortable columns by choosing details. The list view column header will vary depending on the object selected, and is only active when a user has selected Details as the View option. Column width can be changed by selecting the column header division and dragging it. The description bar 50 at the top of this pane shows the current view path (context).

The Log View Pane

Figure 5:
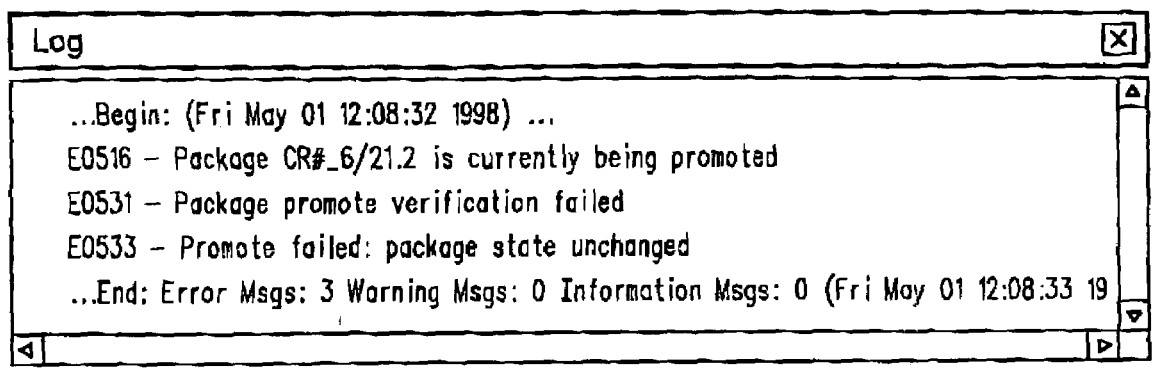
FIG. 5 is a screen snapshot of an undocked Harvest Explorer Log View Pane.

The log view 44 displays across the bottom of the screen when output exceeds the status bar capacity. Results from most processes will be displayed in the log view. After executing a process, such as check out, check in, or promotion, a user receives a message in the log view describing the status of the process. The contents of the log view are maintained throughout a session, unless it is cleared. An example of an undocked log view and associated entries is shown in FIG. 5.

Toolbars

The toolbar 48 contains shortcut buttons for invoking menu functions and online help. When the user positions the mouse cursor on a shortcut button, a toolbar tip will display and the current function is described in the status bar.

Figure 6:
FIG. 6 is a screen snapshot of a Harvest Explorer Toolbar.

The toolbar 48 can be enabled or disabled by selecting View▶Toolbar. The toolbar 48 can be undocked and docked by dragging and dropping it. An enlarged view of the Toolbar is shown in FIG. 6.

Figure 6A:
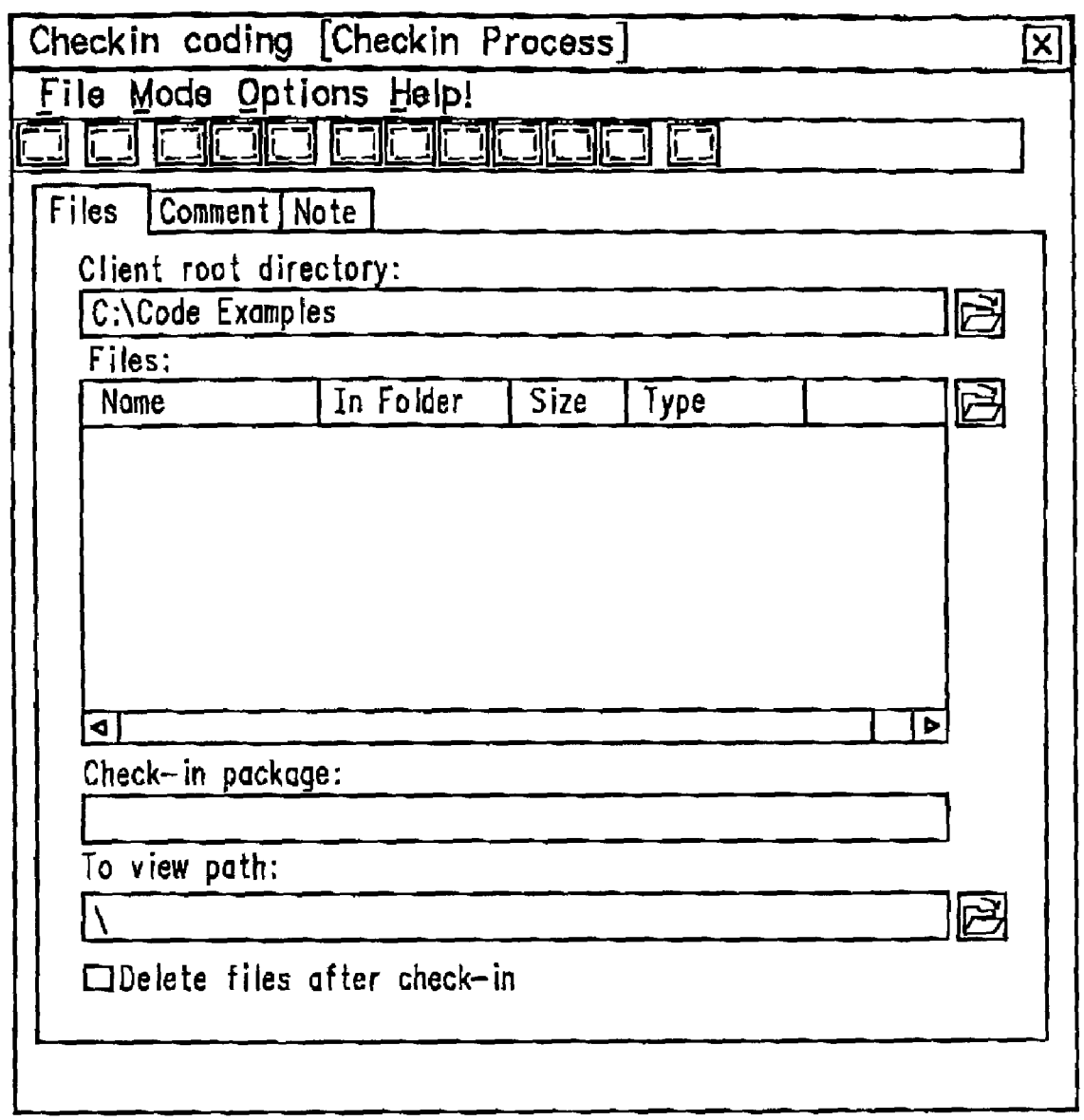
FIG. 6A is a screen shot of a Harvest Explorer Check-In process window.
Figure 6B:
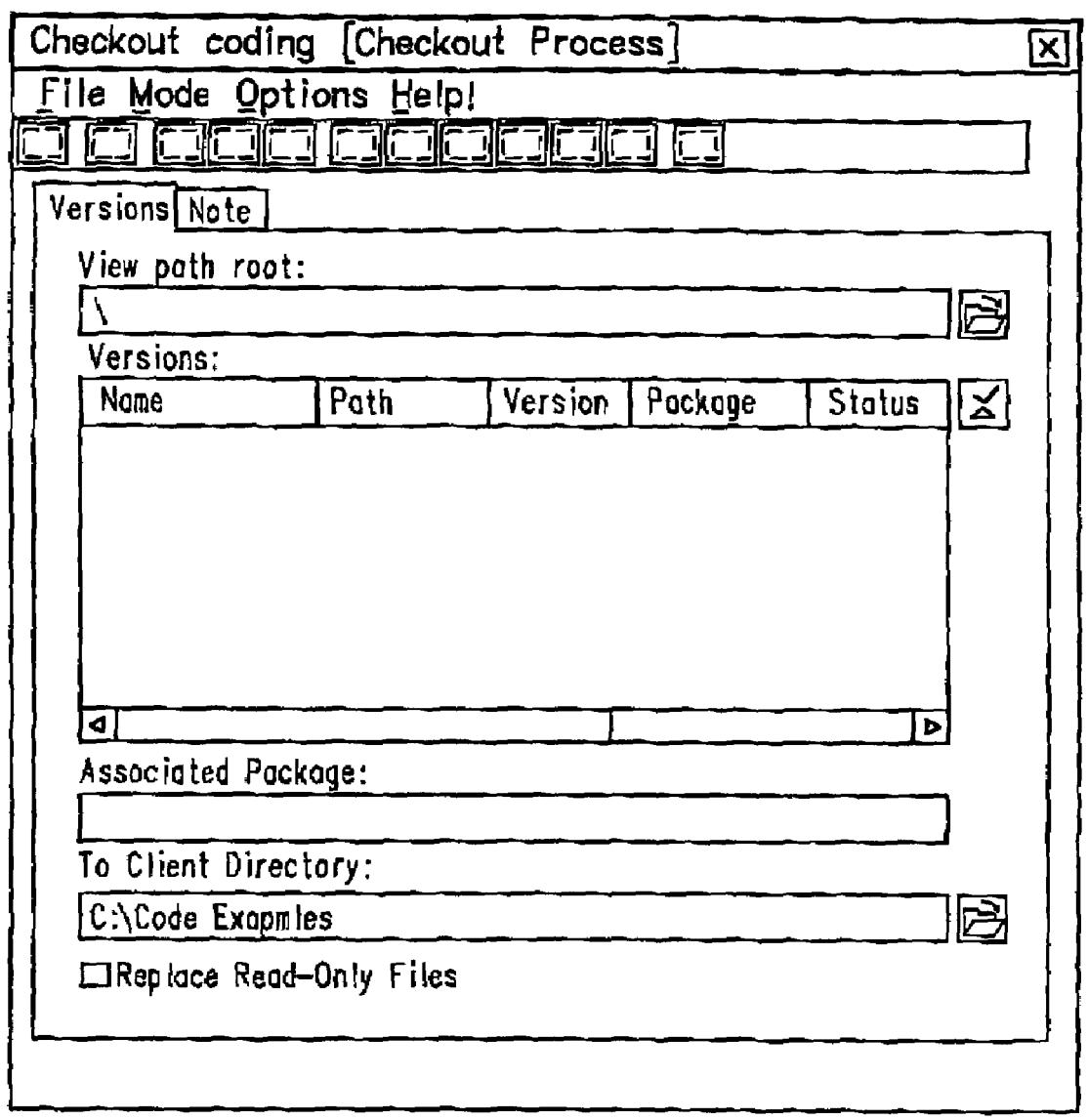
FIG. 6B is a screen shot of a Harvest Explorer Check-Out process window.
Figure 6C:
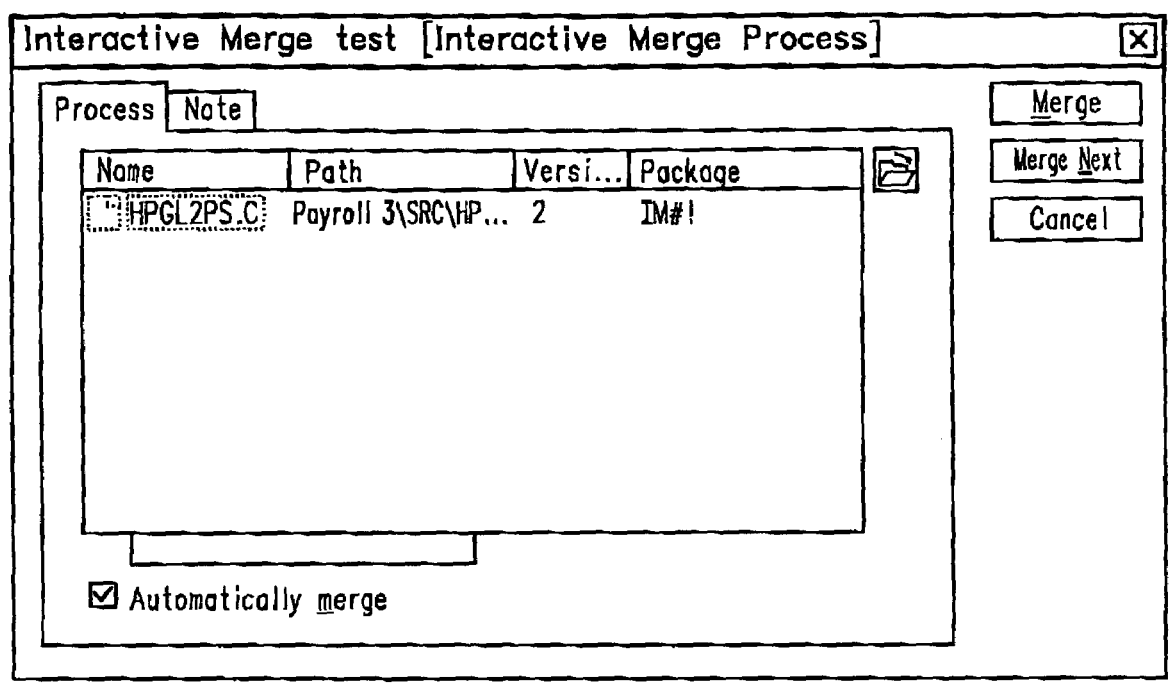
FIG. 6C is a screen shot of a Harvest Explorer Interactive Merge listing window.
Figure 6D:
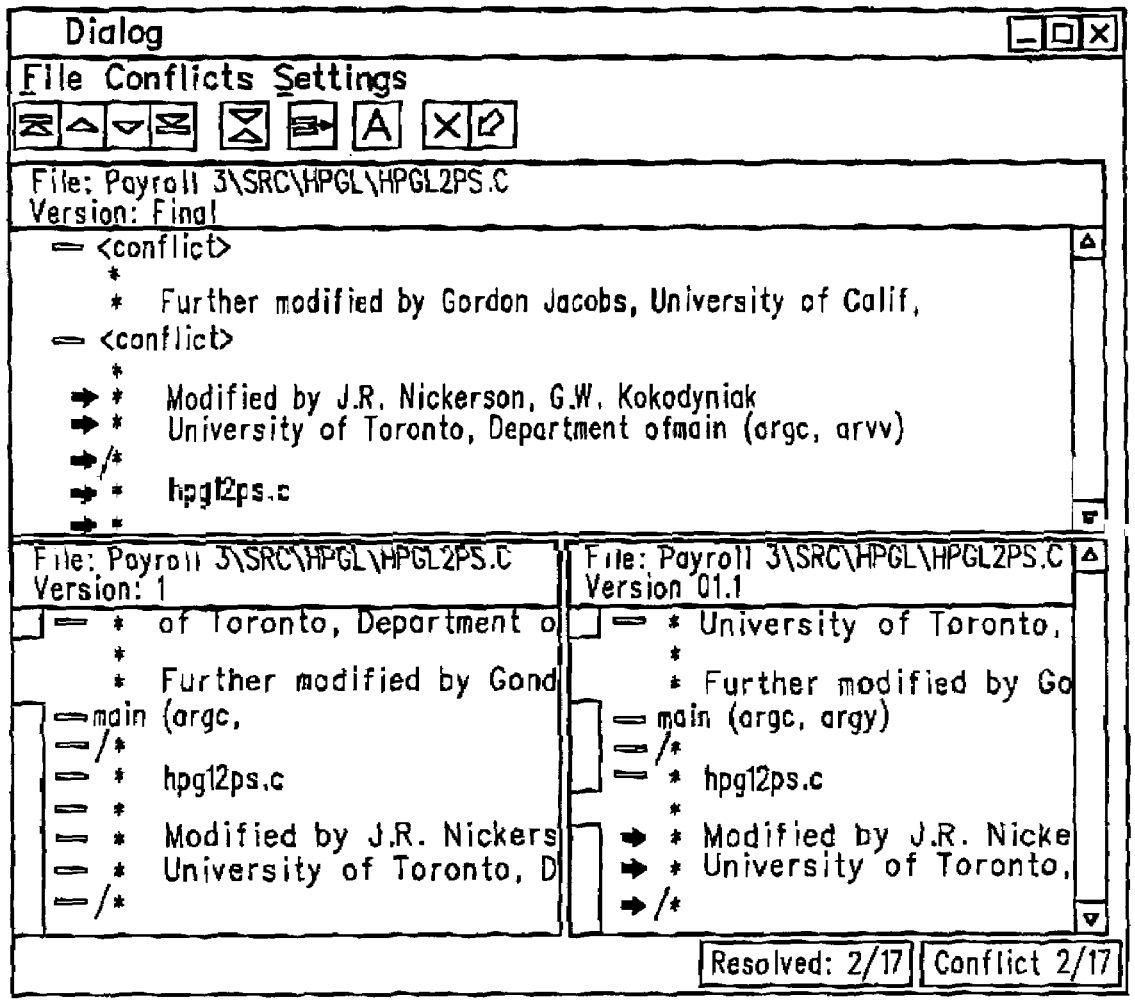
FIG. 6D is a screen shot of a Harvest Explorer Interactive Merge dialog.

The Harvest Explorer form view (see FIG. 26) and the check in (see FIG. 6A), check out (see FIG. 6B), and interactive merge process windows (see FIGS. 6C & 6D) have toolbars which contain shortcut buttons for some menu options in the window. The check in and check out process window shortcut buttons are synchronized with the option selected in the menu, enabling the user to easily determine currently selected options.

Status Bar

The status bar 52 at the bottom of the screen is a one-line text display area that reflects the user's last action, the current environment, state, and object. If the user positions the mouse cursor on a toolbar button, the status bar will display a message describing the button's function. The status bar can be enabled or disabled by selecting View▶Status Bar.

Pull-Down Menus

The Harvest Explorer has seven menus: File, Edit, View, Processes, Go, Tools, and Help (46, FIG. 4). These menus define Harvest Explorer actions which are enabled or disabled according to the context set.

File

The File menu contains these options: New Form, Open Context, Save Context, Save As, Properties, Print, Print Preview, Print Setup, Create Directory, Recent Contexts, Spool Log to File, Stop Spooling Log File, and Exit.

Edit

The Edit menu contains actions that pertain to the objects displayed or selected on the Harvest Explorer. These commands are available on the Edit menu: Copy, Paste, Select All, and Invert Selection.

The Select All command selects all the objects in the list view pane. If the user has an object selected in the list view, the Invert Selection command selects all of the other objects in the list view.

View

The View menu enables the user to customize the Harvest Explorer screen. From this menu the user can enable and disable the Toolbar, Filter Environments, Log, View, and Status Bar options.

Upon enabling Filter Environments, only the user's current environment is displayed on the Harvest Explorer.

Choosing a View style causes objects in the list view pane to be displayed in one of four style: Large icons, Small icons, List, and Details. The default style is Details (See FIG. 2).

The Refresh command updates displayed data.

Figure 7:
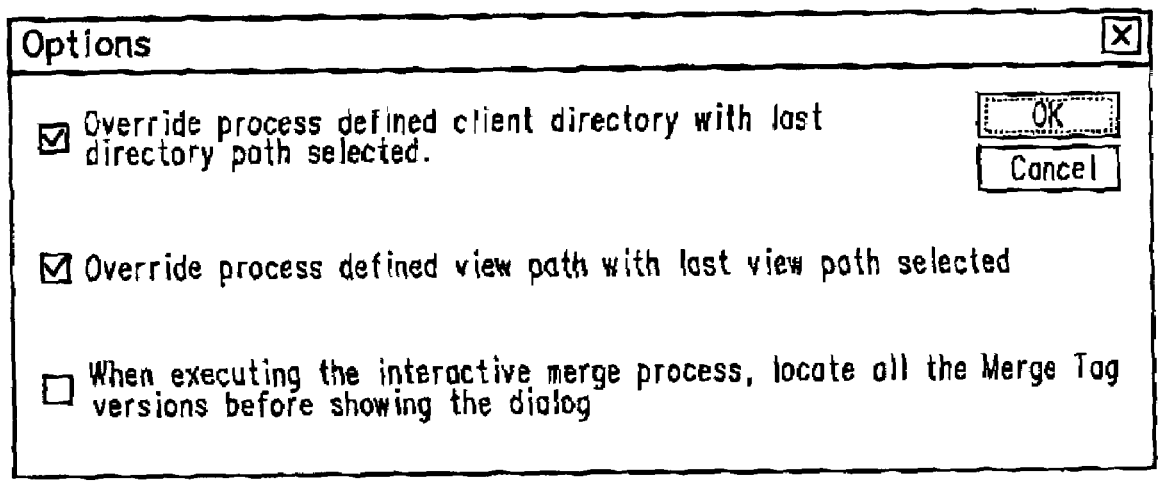
FIG. 7 is a screen snapshot of a Harvest Explorer View Menu Options window.

The Options command opens the Options window as shown in FIG. 7, where a user can specify whether a root directory and view path root will be established for the check in and check out processes. The user can also specify to locate all merge tag versions of an item before the interactive merge process window is invoked.

Processes

The Processes menu displays the list of all processes defined for the current state. This menu is disabled if a state has not been selected as part of the context. The content of this menu varies for each state, depending on how the life cycle and processes have been set up. The order of the processes on the menu reflects their order as defined in the State Editor. Selecting a process from this menu opens a process window.

Go

Selecting this option moves the context up one level.

Tools

The Tools menu enables the user to open:

the Version Chooser to locate item versions in the Harvest database. The search results are displayed in the Version Chooser list box.

the Form Chooser to locate forms. The search results are displayed in the Form Chooser list box.

Help Menu

The Help menu allows the user to access online help for the Harvest Explorer. Once the help system is invoked, the user can utilize the table of contents to find topics, or use keyword searches to locate a particular topic. In addition, The Tip of the Day feature and the About Harvest Explorer window can be opened from the Help menu.

Mouse Functions

Various functions and menus are available by the left-click, right-click, and double-click of the mouse, and the drag and drop of objects.

Left-Click

A single click of the left mouse button:
- On the node expansion button (+ or −), expands or collapses the contents of the object in the tree view, but does not set the context.
- on an object in the tree view, sets the context and displays the context in the description bar; the contents of that object are listed in the list view rather than directly beneath the object. A single click on an object in the tree view does not allow expansion of the contents of an object like clicking the node expansion button does.
- on a column heading in the list view pane, sorts the column. Clicking again reverses the sort from ascending to descending. Sorts are appropriate for the data type in the selected column. For example, a package list can be sorted by the Create Time column, reflecting the date and time the package was created.

Double-Clicking:
- on an object expands that object and sets the context, which is then displayed in the description bar.
- on a form opens that form in form view.

Right-Click

Figure 8:
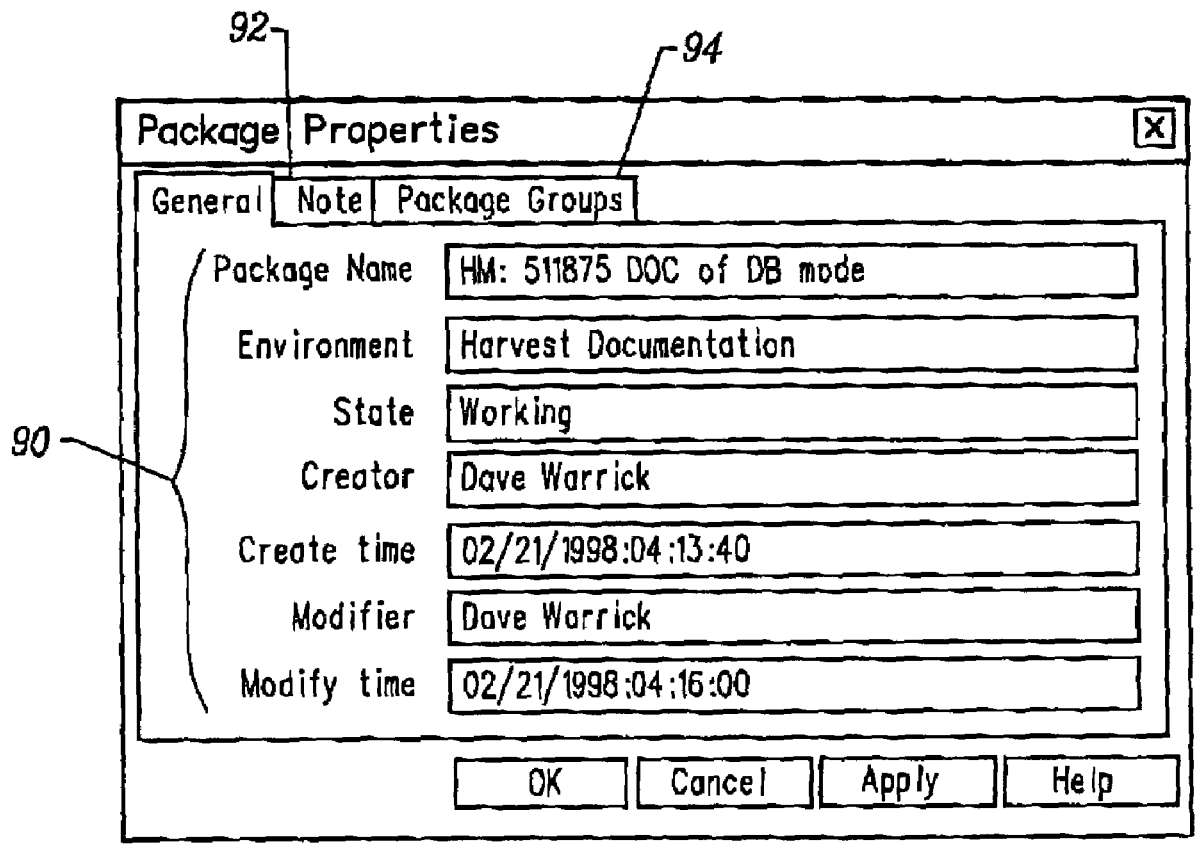
FIG. 8 is a screen snapshot of a Harvest Explorer Properties window.

A single click of the right mouse button on a package invokes an option menu from which the user can:
- open a Package Properties window as shown in FIG. 8 to view and/or edit General properties of the package 90, read a descriptive note as specified in the process editor 92, and use a Package Groups window 94. In the Package Groups window, all package groups in the current environment are displayed, and are available for selection.
- open a process window that is associated with the object.
- invoke the rename command.

Additional right click functions are illustrated in FIG. 8A. Furthermore, the right click may be utilized to perform a view version that performs checkout of a version and execution of an application registered for the type of version checked out. View Version may be invoked from either of Version Chooser, Package Versions, Item View of a version, or any other display or menu that provides access to a version (generally, such invocation may be made from any Harvest display that includes either an icon or listing of a version).

Harvest performs View Version by checking out the version into a temporary directory. Either a user selected or an operating system default temporary directory may be utilized (default Windows temp directory, for example).

Once the version is checked out, Harvest invokes the application registered for the version type and provides the checked out version for execution with the application. For example, if the version right clicked is a text file and the registered application for a text file is Notepad, Harvest would checkout the version to the temp directory and execute the Notepad application. The checkout version would then appear for viewing or modification in the Notepad application.

Drag and Drop

A feature of the Harvest Explorer is the ability to manipulate objects by dragging and dropping them.

For example:
- Packages can be dragged from one state and dropped in another to accomplish promotes and demotes.
- The Harvest Explorer check in window accepts files dragged from the Windows Explorer or other system.
- The log view pane and the toolbar can be undocked and docked.

An alternative configuration of Harvest Explorer allows object check in to be invoked solely by dragging an object into the Harvest Explorer. The object not currently checked in is recognized as such by Harvest Explorer which automatically invokes the required routines to accomplish check in.

Keyboard Navigation

The use of the keyboard enables the user to navigate through the Harvest Explorer as follows:
- The arrow keys allow navigation up and down, and expand and collapse objects in the tree view pane. As the user moves between objects in the tree view, the contents of the objects will be listed in the list view.
- Using the letter keys on the keyboard enables navigation to an object. By clicking in a list and typing a letter, the cursor will go to the next object name that begins with that letter, ignoring case. For example, if the user has three object names that begin with the letter D, clicking d will bring the user to the first object whose name begins with D. Clicking d again will bring the user to the next object whose name begins with d.
- The user can move up one level in the user's context by using <Backspace>, by clicking on the toolbar Go button, or by selecting the menu bar Go option.

Harvest Explorer Contexts

Through the use of the Harvest Explorer interface and the object and context selected, various activities can be performed. A context is the user's location within Harvest as defined on the Harvest Explorer. The availability of actions is defined by the context. The context also delimits what is displayed according to access and permissions. The user can set a context by choosing an object in either the tree view or list view. The list view always reacts to changes in context from the tree view. The description bar at the top of list view pane shows the current context (view path). The status bar shows the current environment, state, and object.

Environment Context

Figure 9:
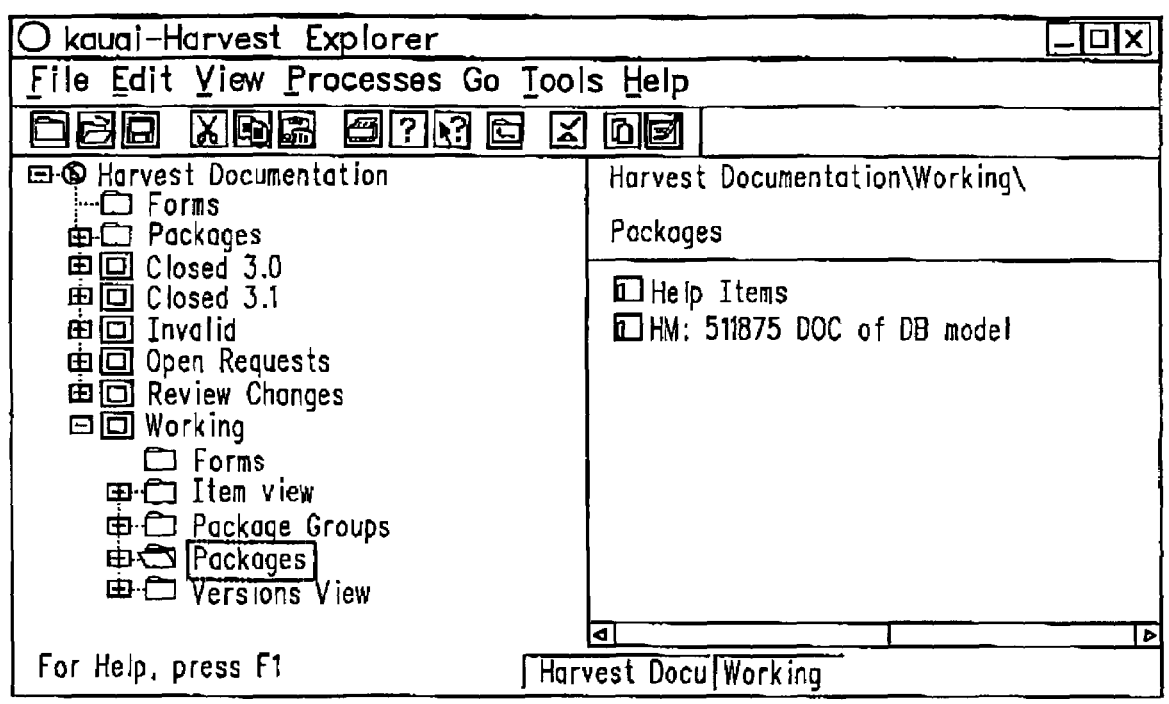
FIG. 9 is a screen snapshot of Harvest Explorer with View>Filter enabled.

The tree view pane lists the states in an environment, a Forms folder, and a Package folder. By default, the active Harvest environments are displayed. An environment context can be selected by clicking on the environment icon or name. To narrow focus and display only one environment on the Harvest Explorer, the user chooses an environment, and then View▶Filter Environments (see FIG. 9, for example); or creates a desktop shortcut button using the Save As command (see Save Context as discussed below).

State Context

Figure 10:
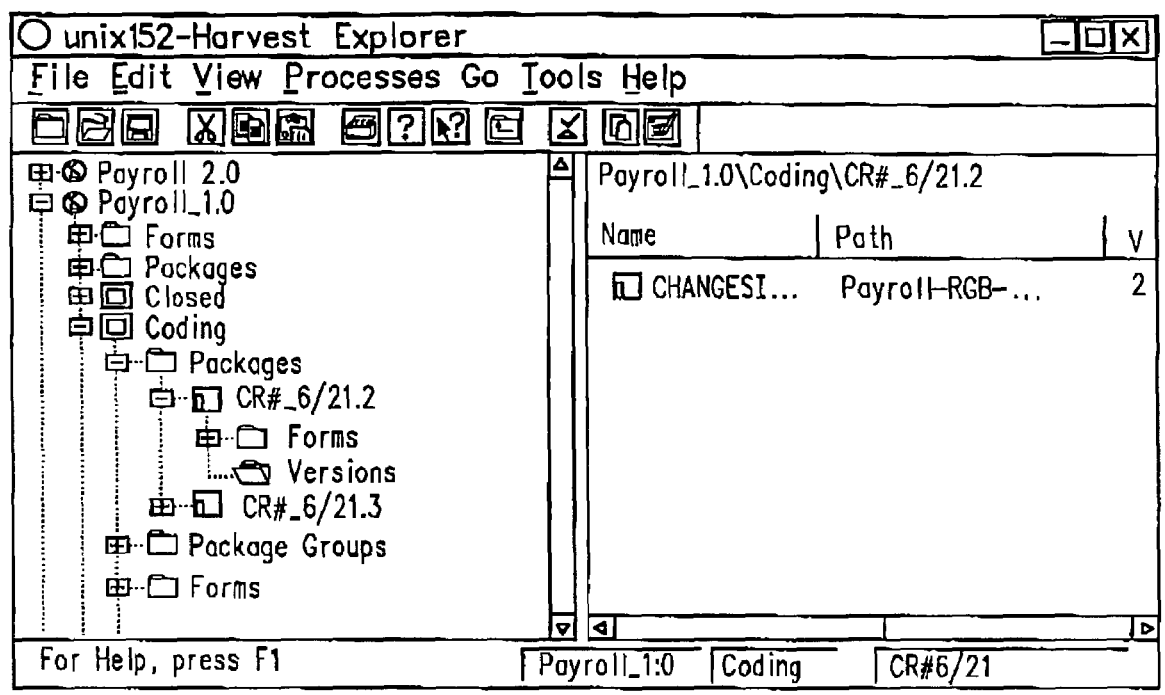
FIG. 10 is a screen snapshot of Harvest Explorer with objects expanded.

A state context can be established by selecting a state in either the tree view pane or the list view pane. In the tree view, click on an environment icon or double-click on an environment to expand that environment (see FIG. 10, for example). The states belonging to the environment are listed below the environment icon and in the list view. A state context can be established by clicking on a state icon or name.

If a state context is established, all its objects are available in the folders: Forms, Item View, Package Groups, Packages, and Versions View. In addition, each process available within the selected state appears under the Processes menu. Users can invoke the processes for which they have access.

FIG. 11 shows the list view pane, with View▸Details enabled, displaying a package's Versions folder expanded. The description bar shows the context, which is the Help Items package in the Working state of the Harvest Documentation environment.

Packages

Package folders are displayed at the environment and the state level. When selected from an environment, a folder displays all the packages in the environment. If a folder is selected from the state level, all the packages in that state are displayed.

If the user has selected a package, Harvest Explorer will use that context and package for package-related processes like check out, promote and demote. In the check in and check out process windows and the Version Chooser, the user is able to open the Select a package window to browse through a list of packages in the current environment and state to select a package.

Right-clicking on a package invokes an option menu. From this option menu, the user can invoke the Package Properties window, and the user can execute any available processes for that package.

Package Groups

When selecting a state in the list view or tree view, a Package Groups folder is displayed. The user can expand the folder to view package groups in the state.

Forms

The forms folder is displayed at the environment, state, and package level. When selected from the environment level, this folder displays all the forms in the environment. When selected from the state level, all the forms in that state are displayed. When a package is expanded, its associated forms are displayed. Double-clicking on a form opens that form in form view.

Item View

When selecting a state, an Item View folder is displayed. The user can expand the folder to view the items in that state. Double-clicking on an item displays the versions of the item.

Items selected on the Harvest Explorer are passed to the list difference, remove item, interactive merge, and check out processes. For check out, the version of the item passed to the process is always the latest in the view associated with the current state. To change the version selected, the Version Chooser from the process window or the Find▸Tools menu is utilized.

Versions View

Versions can be selected on the Harvest Explorer by double-clicking on an item. Versions selected on the Harvest Explorer are passed to the list versions, interactive merge, delete versions, and check out processes. This allows the user to bypass the Version Chooser. The Version Chooser can be used to perform complex filtering, see versions that are not available in the view associated with the user's current state, or execute a recursive search (see related discussion below).

Snapshot View

If the state context is associated with a snapshot view, the tree view snapshots are represented by a small set of eyeglasses directly to the left of the snapshot name; in the list view, the objects in the snapshot view appear in blue.

Context Commands

The user can establish a context by expanding environments and states, and selecting objects, or by using the File▸Open Context, or File▸Name of context command on the Harvest Explorer menu. The user can also save a context to a specified location, including the desktop, using the Save As command.

Open Context

Figure 12:
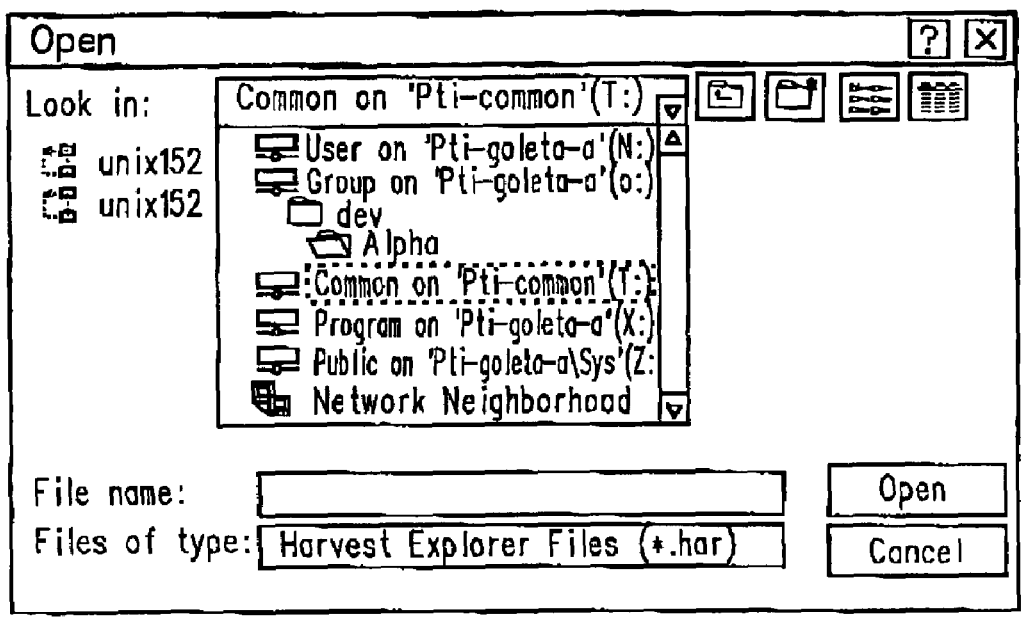
FIG. 12 is a screen snapshot of a Harvest Explorer Open Context window.

The Open Context window, invoked by a Select File▸Open Context (see FIG. 12, for example), is used to use saved values to determine the environment, state, and values for the user's context in an external directory system and in a Harvest Explorer repository.

Save Context, Save As

A context can be saved by selecting File▸Save Context or File▸Save As from the Harvest Explorer application menu.

Figure 13:
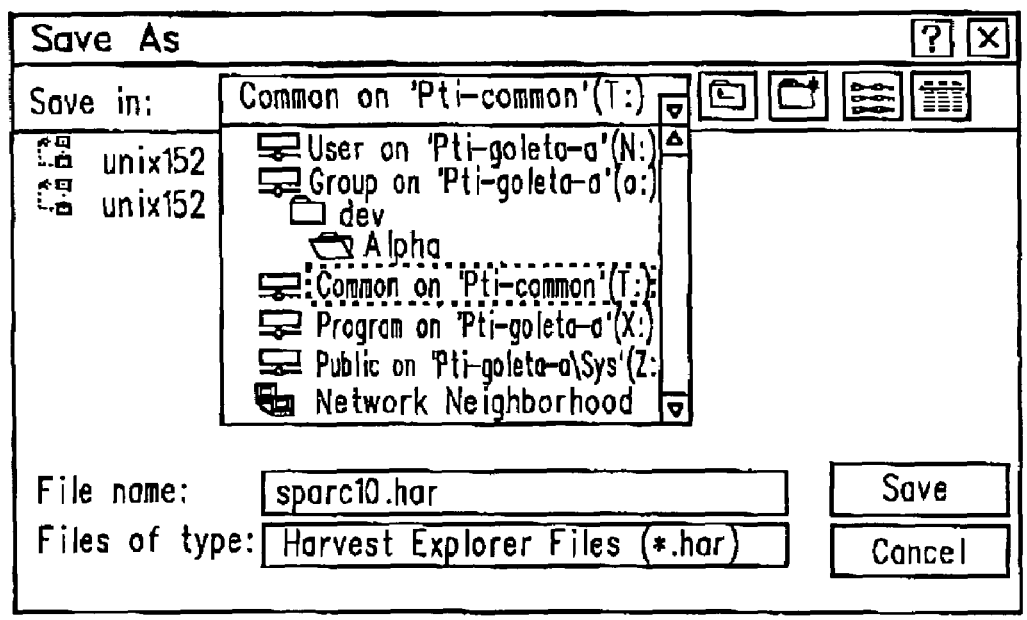
FIG. 13 is a screen snapshot of a Harvest Explorer Save Context window.
Figure 14:
FIG. 14 is a graphical illustration of a Harvest Explorer shortcut button.

This opens a Save As window, see FIG. 13, which enables the user to save the context to a specified location. Saving a context to the user's desktop creates a shortcut icon button to the user's desktop (see FIG. 14, for example). This enables the user to easily open the Harvest Explorer to that context by double-clicking on the shortcut.

Most Recent Contexts

The four most recent contexts saved are displayed in the File menu. The user can open these contexts directly by choosing File▸Name of context. If the environment or state for the saved context no longer exists, an error message is displayed.

Contexts for Files and Items

The client directory context and repository view path determine the files and items displayed on the Harvest Explorer windows when these contexts are selected. These contexts also play an important role in processes such as check in and check out that operate on files and items. By selecting a client root directory, the user is setting a default client directory that will be inserted in the client root directory field during subsequent check in processes. This allows the user to synchronize the check out process with the view path structure already established in the repository.

The Root Directory

The Harvest Explorer uses the concept of root directories to allow the user to control how the client directory and view path contexts change. The user's context is defined by the user's current position in the hierarchy as the user moves about in the repository or in a set of client directories. This is reflected in the view path displayed in the description and status bars. When the user changes position, the path is automatically updated. The user's current position in the item and file structure is copied by default into the windows that use this information.

In the Version Chooser and in the check in and check out process windows, the user can set the root directory or view path to a certain location. Choosing the root causes the context to remain fixed while the user moves around in the hierarchy below that point. This is typically used to establish a point at which paths in the repository mirror working directories on the client. If the user sets a root and then selects a directory or path above it, Harvest automatically unlocks the root so that the path moves with the user.

Two distinct roots can be defined:
Client Root Directory when viewing files
View Path Root for repository paths, when viewing items and versions.

It is very important to understand how the directory and path contexts work together with the roots during check in and check out operations. If a user frequently checks out items from the same location in the repository to the same client directories, the user can streamline the check in and check out processes by setting roots correctly. Once the roots are set, Harvest will thereafter calculate the correct destination for the check in or check out process.

Mirroring Internal and External Structure

When a repository is created, an administrator loads a set of directories and files into it. This external directory structure is duplicated in the repository and in the Master Views of any environments that use it. When viewing the paths in a repository, the top-level path is the repository name, with the application directory structure beneath it.

Figure 15:
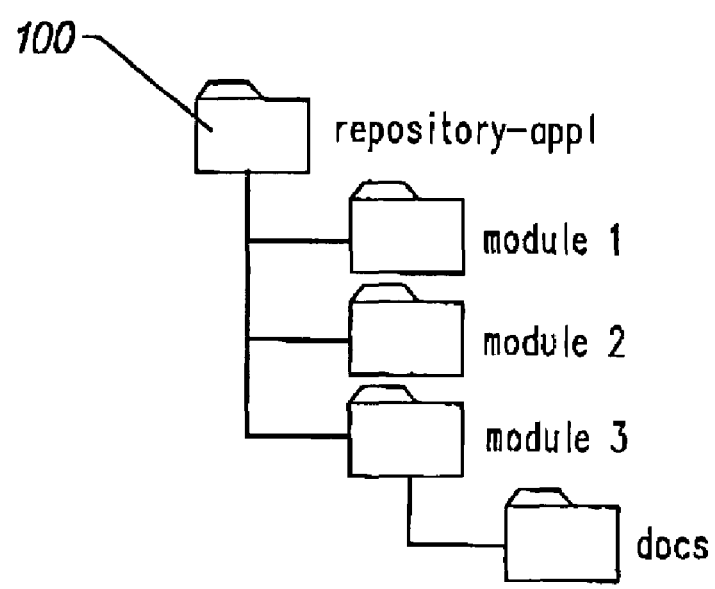
FIG. 15 is a graphical illustration of a Harvest Explorer sample application structure.

Typically, a similar directory structure on the client is maintained by individual developers, and is used for updating application items and building the application for testing. For example, FIG. 15 illustrates the structure of an application called app1.

Figure 16:
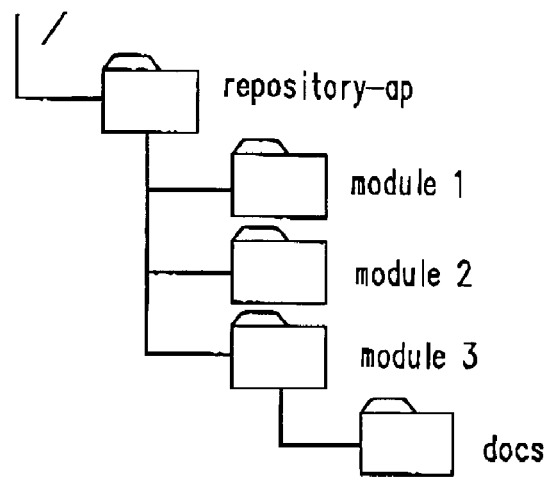
FIG. 16 is a graphical illustration of a Harvest Explorer sample repository structure.

When this application is loaded into a repository named repository-app1 100, the application structure is duplicated in the Harvest repository. When a user accesses Harvest Explorer to look at items in a view that includes this repository, the repository paths appear as shown in FIG. 16.

Figure 17:
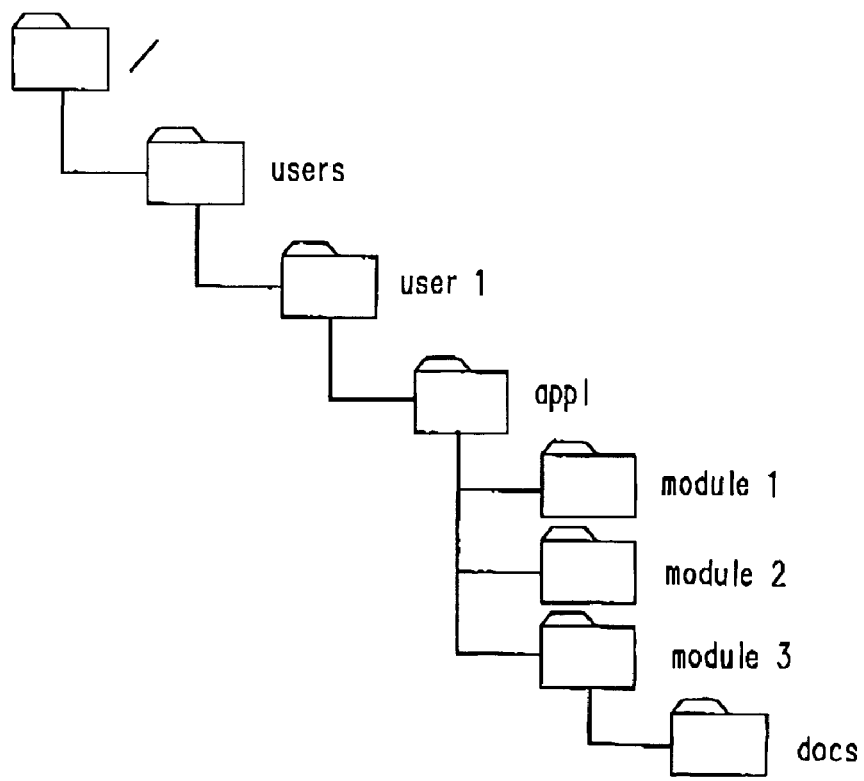
FIG. 17 is a graphical illustration of a Harvest Explorer sample user path.
Figure 18:
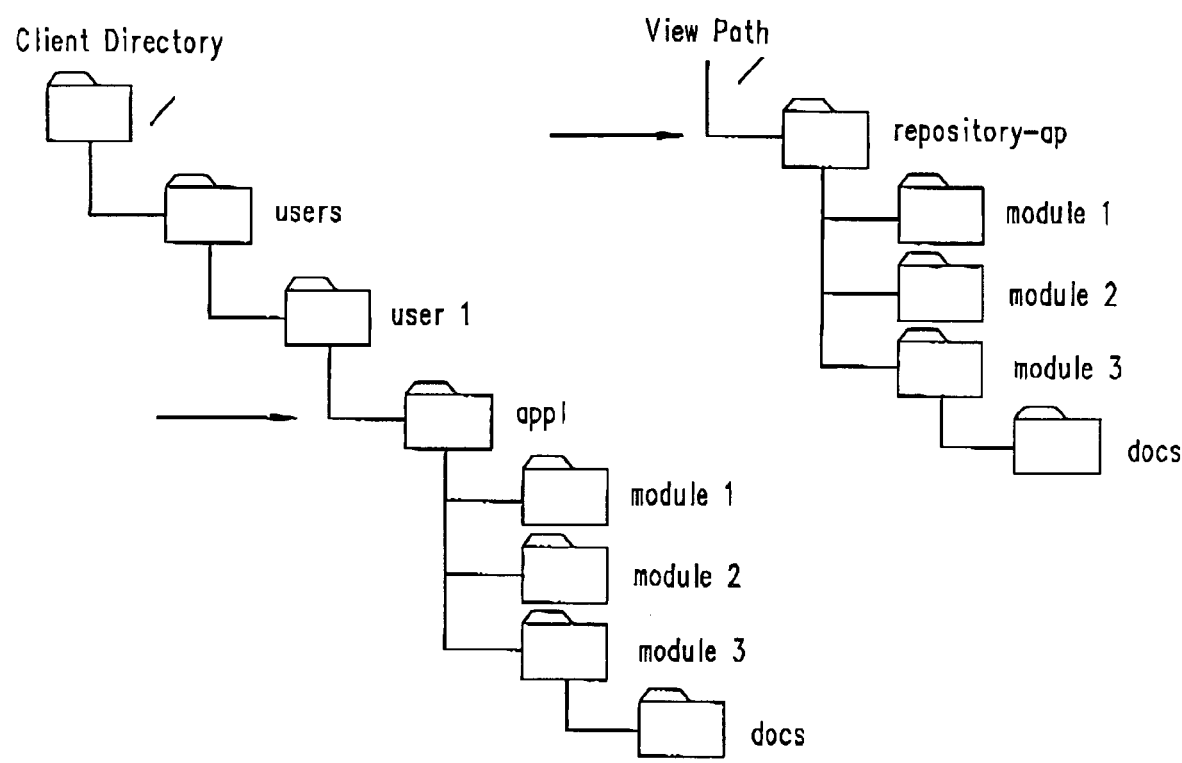
FIG. 18 is a graphical illustration of a Harvest Explorer root path and directory.

Assume that a developer named user1 has been working on this application and has working directories on a UNIX client mirroring the application structure in a path as shown in FIG. 17. The developer can use roots to synchronize the internal and external directory structure. In this case, user1 should set the view path root to /repository-app1 and the client directory root to /users/user1/app1. These two roots mark the point of synchronization between items inside the repository and their corresponding files (see FIG. 18).

When user1 wants to check out files, Harvest automatically calculates the correct default for the destination client directory, based on these roots. Similarly, during check in Harvest automatically knows where to put the checked in files in the repository without the user selecting a view path with the chooser.

Moving Above the Root Point

Using the previous example, it can be seen why the roots are automatically unlocked if the user moves above them. For example, if a user selected the /users directory in file view and the root remained locked at users/user1/app1. If the user selects a file for check in, Harvest attempts to calculate a view path position two paths above the root, however, such a position does not exist.

Recursive Search Operations

During a recursive search operation, Harvest starts at a specified client directory or view path and searches all directories or paths below it for files or items to operate on.

The Recursive search option is typically used with other options available on the check in and check out window that let the user specify how the synchronization should occur. Harvest provides three choices:

Preserve the directory or path structure. This causes Harvest to look for a matching path for each directory.

Preserve and create the directory or path structure. In this case, Harvest matches paths and directories and creates corresponding ones if they are missing.

Take items from multiple paths or files from multiple directories and place them all in one directory or path, disregarding the structure.

Harvest Operations and File Attributes

Harvest assumes a long-term relationship between a set of user working directories and a Harvest repository structure. Within these working directories, Harvest uses file permissions to indicate files that are not available for update. File permissions can be altered by Harvest during check out and check in.

Harvest manages permissions according to the state of corresponding items in Harvest, therefore it is recommended that users do not alter file permissions on their own.

File permissions are handled somewhat differently depending on the client's operating system. For example, UNIX makes much greater use of file permissions than PC operating systems. On Windows and OS/2 platforms, there is only one level of access permission, represented by the read-only attribute, used by Harvest.

Check Out and File Permissions

On PC client systems, checking out a file for Browse or Synchronize creates a file on the client file system that is marked as read-only. This indicates that the file cannot be modified and checked in because these modes do not create a reserved version. When checking out for Update or Concurrent Update, the file is given normal (writable) file status.

On a UNIX-based system, when a file is checked in to Harvest, information about file permissions is maintained in the Harvest database. When the corresponding item is checked out for Update, the same file permissions are set on the client file, with one exception. Any time an item is checked out for Update, the user performing the update is always given write access to the file so that changes can be made.

For example, consider a UNIX file with the following permissions:

r-xrwxrwx

When this file is checked in to Harvest, the file permissions are stored. Upon check out for Update, the permissions will be:

rwxrwxrwx

When a file is checked out for Browse, Harvest does not use the exact information it stored with the file. It places the file in the directory without write permission for both user, group, and other. The permissions will now look like this:

r-xr-xr-x

Check In and File Permissions

When a user has modified a file and checks it in with the Update and Release option, Harvest modifies the file permission on the client file system to be read-only. This indicates that the file should not be changed until it is checked out again for Update.

Harvest does not change the file permission if the Update and Keep option is used during check in, because in this case the item remains reserved and the user can continue to update the file.

File and Item Case-Sensitivity

Harvest behavior differs between UNIX and PC platforms because of the case-sensitive/case-aware behavior of file systems on these platforms.

On UNIX platforms, Harvest is case-sensitive for file and item names. If the item file.c is checked out to a UNIX client, the file must be checked in with this name; if the case of the name is changed to FILE.C on the client system prior to check in, it will be checked in to the repository as a new item.

On PC platforms, Harvest is not case-sensitive. If the item File.c is checked out to a PC client, this item can be successfully checked in as FILE.C, file.c, or as any other case. Harvest is case-aware on PC platforms, and the repository always maintains the case of the item as it was originally checked in or loaded.

Replacing Read-Only Files

If the Replace Read-Only Files option is enabled during check out, files are replaced even though the access is read-only. This means that if the user has items checked out for read-only, the user can check them out again for read-only or update without having to manually modify the file's access.

On UNIX systems, file ownership will effect the results of this option. When used alone, the Replace Read Only Files option overwrites read-only files only if the user executing the check out is the owner of the files being replaced. To allow a check out process to overwrite files on the UNIX file system regardless of file ownership, the Share Working Directory option must be enabled in the process editor.

Files that exist with write permission are never overwritten. Harvest assumes that such a file has been checked out for Update and not checked back in yet. Overwriting the file might cause a user to lose unsaved changes.

Date and Time Stamp

When a file is checked in, Harvest stores the file modification date and time, as well as the date and time associated with the version created in Harvest. When an item is checked out, the current date and time stamp are placed on the file. This algorithm is followed because it provides better support for the build process by ensuring that the date and time stamp of source files is more recent than their corresponding object files.

Consider what would happen in the following scenario if file modification dates were used. Item source1.c is modified on April 1 by package STR-0001 and on April 2 by STR-0002. STR-0001 is promoted to QA, but QA staff is not able to begin testing until April 5. A QA user checks out for read-only the latest in the QA view to build the application on that date. The file source1.c is placed in the client directory with a date of April 1. When compiled, its corresponding object file has a date of April 5.

STR-0002 is promoted and on April 6, QA personnel check out its changes. File source1.c now has a modification date of April 2 and its corresponding object file has a date of April 5. The make program will consider the object newer than the source and not compile the latest version of source1.c.

When the modification date of the file reflects the current date, this problem does not occur, and the object is out-of-date whenever the source is checked out.

The Version Chooser

The Version Chooser allows the user to search view paths to locate and select item versions; then the user can execute a process on his/her selection. The Version Chooser supports multiple filtering operations to focus selections precisely. The various options on the Version Chooser work in conjunction with one another to allow the user to select particular versions according to multiple criteria.

When the chooser is initially displayed, its list box is not displayed. The user must press the Find Now button for the current filtering parameters to take effect, and for the versions matching the filtering criteria to be displayed in the list box. Descriptions of these versions are listed in sortable columns. Column width can be changed by selecting the column header division and dragging it. Versions can be selected in the list box to pass to a process window, or the Version Chooser can be used simply to obtain version information. A new search can be executed without closing the chooser by clicking on the New Search button. Clicking on New Search does not return an object to the parent window from which the chooser was invoked, and removes any previously selected object from the field. This is useful when filtering. A status bar at the bottom of the list box displays how many items were found.

If the user has selected a filter but has not pressed the Find Now button, the Version Chooser list box will still show the previous parameters as being in effect.

The Version Chooser has two pull-down menus: File and Process. These menus define actions that can be taken on the filtering results. The processes that appear in the Process menu are determined by the processes available in the state that was specified in the filtering options before the search was executed.

The Version Chooser also has three tab pages used To set filters: Name and Location, Date, and Advanced. Clicking on the tab brings that page to the forefront.

Name and Location Page

Figure 19:
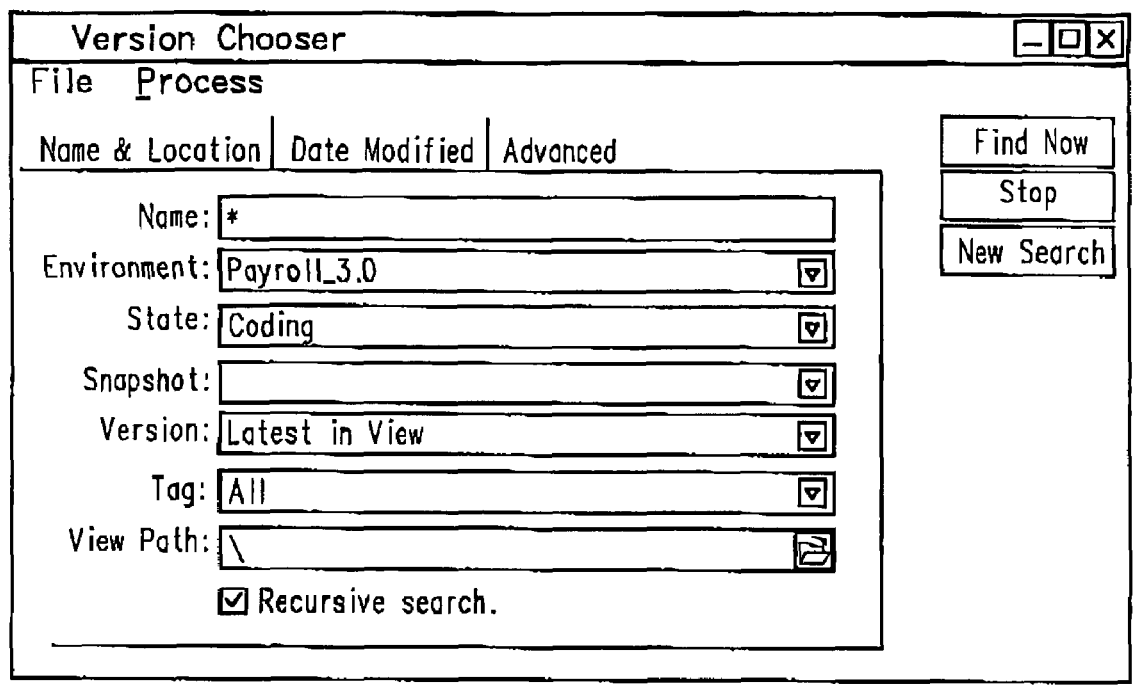
FIG. 19 is a screen snapshot of a Harvest Explorer Version Chooser Name and Location page.

The Version Chooser Name and Location page, illustrated in FIG. 19, allows the user to select what items to search for and in what environment and state to search (the Harvest Explorer selection creates the default environment and state), and has the following fields:

Name

The Name field allows the user to filter items with versions to be displayed according to a naming pattern. Any number of wild cards (*) in any position can be used for multiple character matching. The use of the question mark (?) is also supported for single character matching. This field is case-sensitive on UNIX clients, but is not case-sensitive on PC clients.

Environment

The user can filter on an environment by using the Environment option menu. This menu lists all of the environments that the user can access. When the environment context has been established on the Harvest Explorer, the Environment box shows that context. If the Version Chooser has been invoked from a process window with a context set, the Environment option is disabled for further selection.

State

The user can filter on a state by using the State option menu. This menu lists all of the valid states for the current environment. When the state context has been established on the Harvest Explorer, the State box shows that context. If the Version Chooser has been invoked from a process window with a context set, the State option is disabled for further selection.

Snapshot

If the state the user has chosen to be part of his/her context is associated with snapshot views in this environment, a snapshot option menu becomes available. This option menu allows the user to select a snapshot to have as part of his/her context. The default for this field is the first snapshot in the environment, as specified by the order of snapshot views in the State Editor.

Version

The Version option menu allows the user to filter the displayed versions in one of four ways:

All in View. This option displays all versions that match the other filtering criteria and that exist in the view associated with the current state. Any later versions of an item in another view that have not yet been promoted to the current state are not displayed. This option is incompatible with viewing branch versions because they do not exist in a view.

Latest in View. This option narrows down the versions displayed to the latest for each item in the current view that match the other filtering criteria. Only one version per item is displayed. This option is incompatible with viewing branch versions because they do not exist in a view.

All. This option displays all versions, including those that do not yet exist in the view associated with the current state, that match the other filtering criteria. This option is not available when viewing versions in snapshot views.

Latest. This option narrows down the versions displayed to the latest for each item that match the other filtering criteria, including those that do not yet exist in the view associated with the current state. Only one version per item is displayed. This option is not available when viewing versions in snapshot views.

View Path

Figure 20:
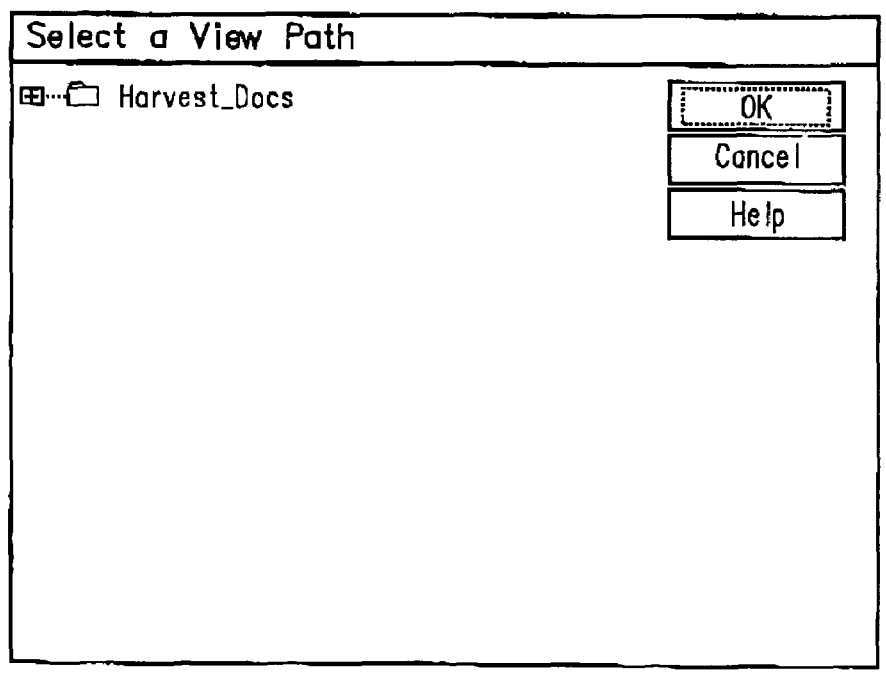
FIG. 20 is a screen snapshot of a Harvest Explorer Select a View Path window.

The View Path option menu allows the user to specify what path in the repository to search. The default view path is the view path currently being browsed. If no view path is given, the default is the wild card (*). Clicking on the browse button next to this field opens the Select a View Path window (see FIG. 20) which enables the user to browse through the available paths and select a location.

Recursive Search

The Recursive search option can be used to display versions that exist in any path below the current one which match the other filtering criteria. The user can then select versions from multiple directories to be included in this operation.

When the user selects Recursive search and clicks on the Find Now button, Harvest actually expands each path so that the item names displayed in the list box include relative paths from the user's current position.

Selecting the Recursive search option disables the View Path option menu. To change position after filtering recursively, Recursive search option is toggled off before moving.

Date Modified Page

Figure 21:
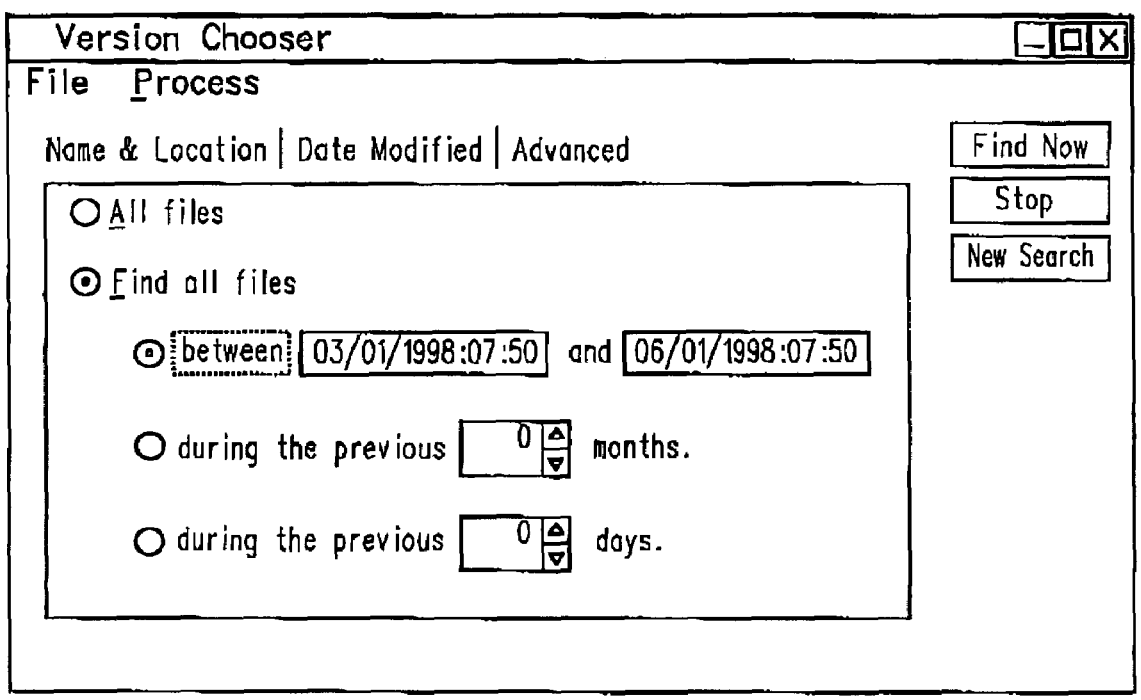
FIG. 21 is a screen snapshot of a Harvest Explorer Version Chooser Date Modified page.

The Date Modified page (see FIG. 21) allows the user to specify a date range for the search. By default, the All files button is selected, indicating date checking will not be performed. Checking the Find all files button enables the user to select different date searches that can be performed. The user can select to search between two dates, search the previous x number of months, or search the previous x number of days. Checking one of these searches will select the Find all files button and activate the Find box.

Advanced Page

Figure 22:
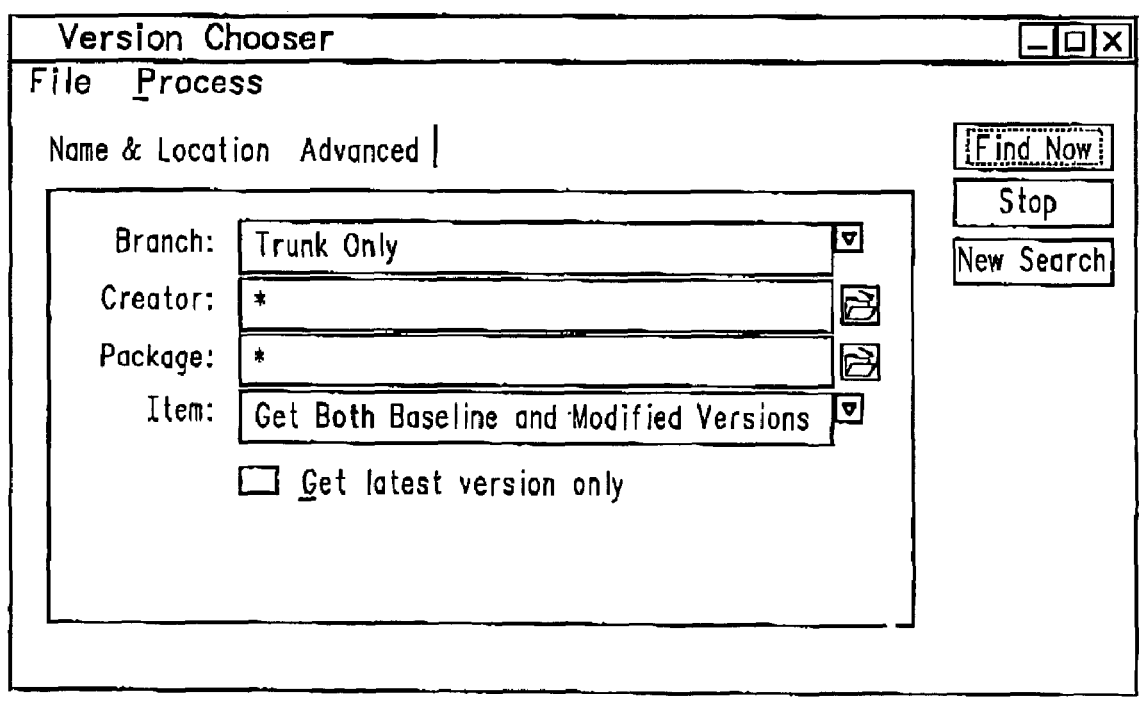
FIG. 22 is a screen snapshot of a Harvest Explorer Version Chooser Advanced page.

The Advanced page (see FIG. 22) has advanced settings that can be figured into the search. The Advanced page allows the user to specify Branch, Creator, Package, Item, and Version criteria.

Branch

The Branch option menu allows the user to filter versions based on their location in the line of descent, both on the environment trunk and on branches. This option allows the user to filter the displayed versions in one of six ways:

Trunk Only. This option is the default and displays versions on the main line of descent in the current environment that match the other filtering criteria.

Trunk & Unmerged Branch. This option displays unmerged branch versions and trunk versions that match the other filtering criteria. This option is not compatible with the All in View and Latest in View Version filters because branch versions do not exist in a view.

Branch & Trunk. This option displays all versions that match the other filtering criteria.

Branch Only. This option displays all branch versions that match the other filtering criteria. This option is incompatible with the All in View or Latest in View Version filters because branches do not exist in a view.

Unmerged Branch. This option displays all unmerged branch versions that match the other filtering criteria. This option is incompatible with the All in View or Latest in View Version filters because branches do not exist in a view. This option is utilized to select versions before executing the concurrent merge process.

Merged Branch. This option displays all branch versions that have been merged to the trunk, regardless of whether they are tagged as merged, that match the other filtering criteria. This option is incompatible with the All in View or Latest in View Version filters because branches do not exist in a view. This option is utilized to select a version before executing the interactive merge process.

Creator

Figure 23:
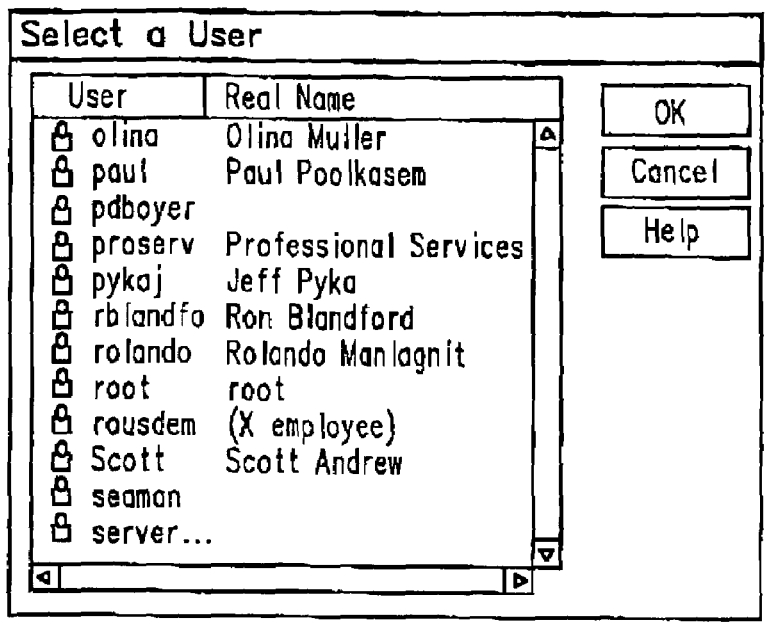
FIG. 23 is a screen snapshot of a Harvest Explorer Select a User window.

The Creator field allows the user to search for an item by the creator. Click on the browse button to bring up the Select a User window (see FIG. 23). This window lists the users who have access to the current environment; a user is chosen, then selected. Wild card searches are allowed. The default is the wild card (*).

Package

Figure 24:
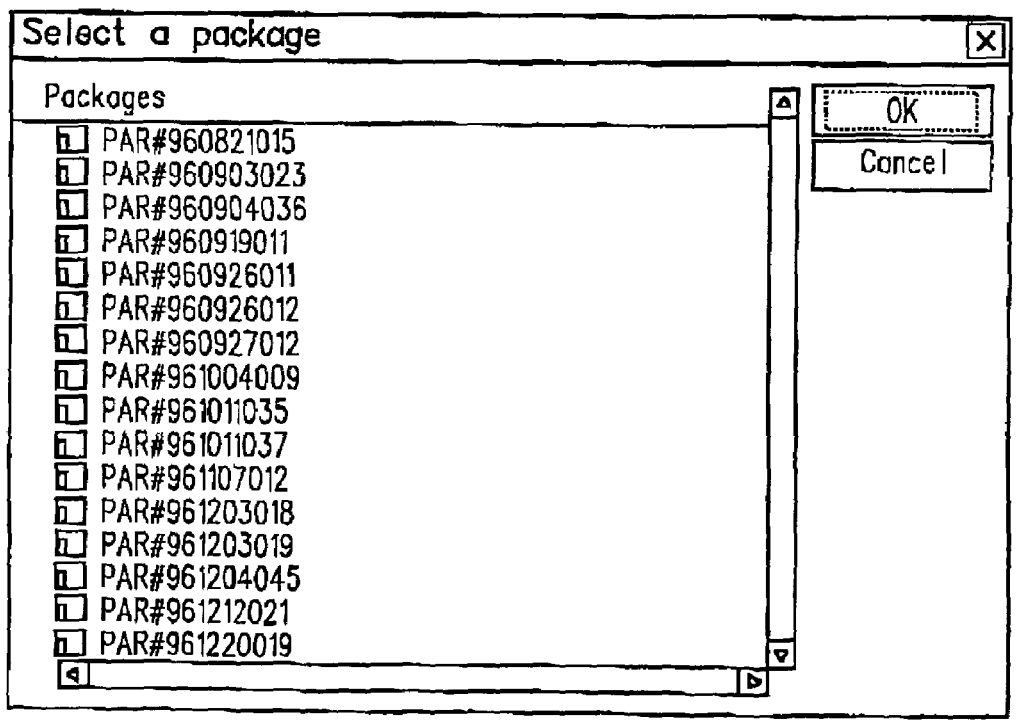
FIG. 24 is a screen snapshot of a Harvest Explorer Select a Package window.

The Package field allows the user to search for an item in a specific package. Click on the browse button to bring up the Select a Package window (see FIG. 24). This window lists the packages in the current environment and state; the user then chooses a package, and selects it. Wild card searches are allowed. The default is the wild card (*).

Item

The Item option menu allows the user to filter the displayed versions in one of three ways:

Get Modified Versions Only. This option displays all versions of items that have been modified in the current environment. For any item with which there are packages associated, this option will cause all versions of the item to be displayed.

Get Baseline Versions Only. This option displays only versions of items which have not been changed in the current environment, and filters out all versions of any item that has been modified. This is the initial version, or version 0, of items for which no changes are associated.

Get Both Baseline and Modified Versions. This option displays all versions matching the other filtering criteria.

Get Latest Version Only

This check box allows the user to select only the latest version number to search for.

Using Multiple Filtering Criteria

To use the Version Chooser effectively, the user must efficiently utilize the various filtering criteria understanding how they interact. Version selection can require specifying multiple parameters. The Name, Creator, Package, and Recursive search parameters can be used to generate a list of items, with version information specified based on the Version, Branch, and Tag parameters. The Latest in View Version option has a special meaning in relation to the Package or Creator filters. This is important, for example, when the user wants to do a package check out, and is described in the next section.

Checking Out Package Changes

States and views are used to create isolated work areas for different functional groups in a life cycle. Changes are promoted and demoted through this life cycle by means of a package; this movement is internal to Harvest.

On the client side, it is common to have working directories associated with different views in the life cycle. For example, developers can have one set of working directories and QA can have a different set. These directories are external work areas that allow each group to build a different version of an application. The version of the application that development is running and testing is usually different from the one that QA is running and testing, based on the state of the change packages in the life cycle.

Harvest provides the Synchronize mode of check out for keeping directories up-to-date with the latest versions in a view. When this mode of check out is used, selected versions are only checked out if they differ (either older or newer) from those in the external file system.

To check out package changes incrementally, filter by the package name in addition to the Latest in View Version filter. The combination of these two filters selects all the items changed by the package, but still gives the user the latest version of the items in the current view. This ensures that changes are not overwritten because of the order in which the user checks out package changes.

Package check out is most effectively used for checking out package changes in a read-only mode. This mode is assumed in the following discussion. Package check out for Update can cause errors because later changes might have been made to the items by other packages. Therefore, only the absolute latest version should be checked out for Update.

Figures 25, 26:
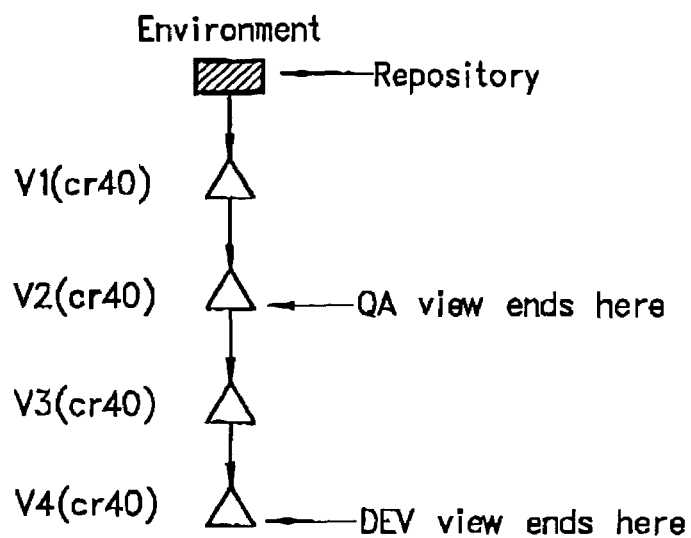
FIG. 25 is an illustration of a Harvest Explorer package check out.
FIG. 26 is a screen snapshot of a Harvest Explorer Form view.

Consider FIG. 25, two packages named CR39 and CR40 have just been promoted to the QA state, which has a different view than the DEV state. The delta tree for one item is shown in the figure. This item was changed by both packages.

In QA, a user checks out the item using the Latest in View and Package filters, with CR39 as the specified package. The Package filter selects this item because it has been changed by CR39, but the Version filter selects the appropriate version of the item that will be checked out. As the latest version in the QA view, version 2 of the item, which includes the changes made for CR40 and CR39, is checked out.

The check out is re-executed using CR40 as the Package filter. Although version 1 is the latest version created by CR40 in the QA view, version 2 is checked out because it is the latest of all versions in the view. If version 1 were checked out, this version would overwrite the changes made by CR39, producing unexpected problems during testing.

To check out version 1 for Browse, a user may select the All in View Version option and select version 1; or, because the latest changes for a package are always in the current view, a user may also select the Latest option. This will always give the latest version created by the package, even if later changes made by other packages exist.

Forms

Figure 36B:
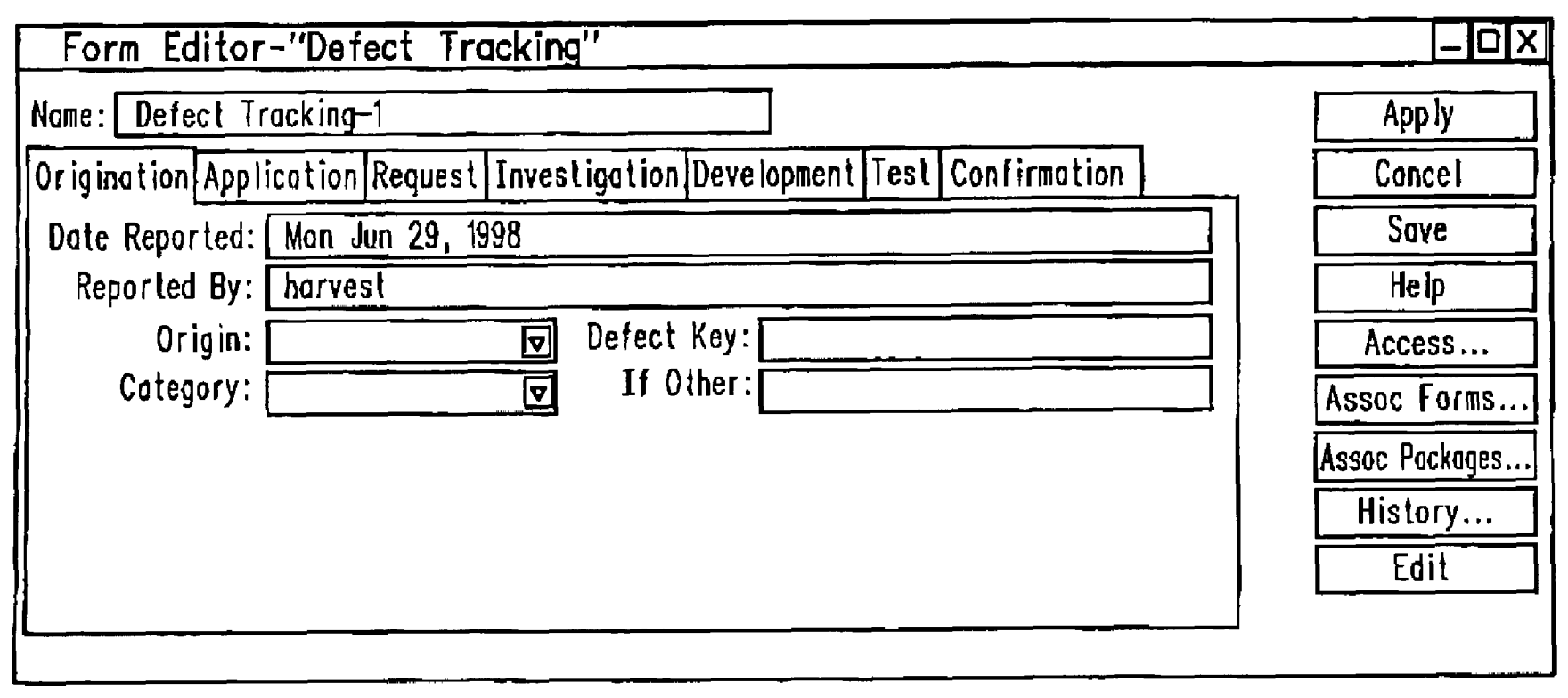
Figure 36C:
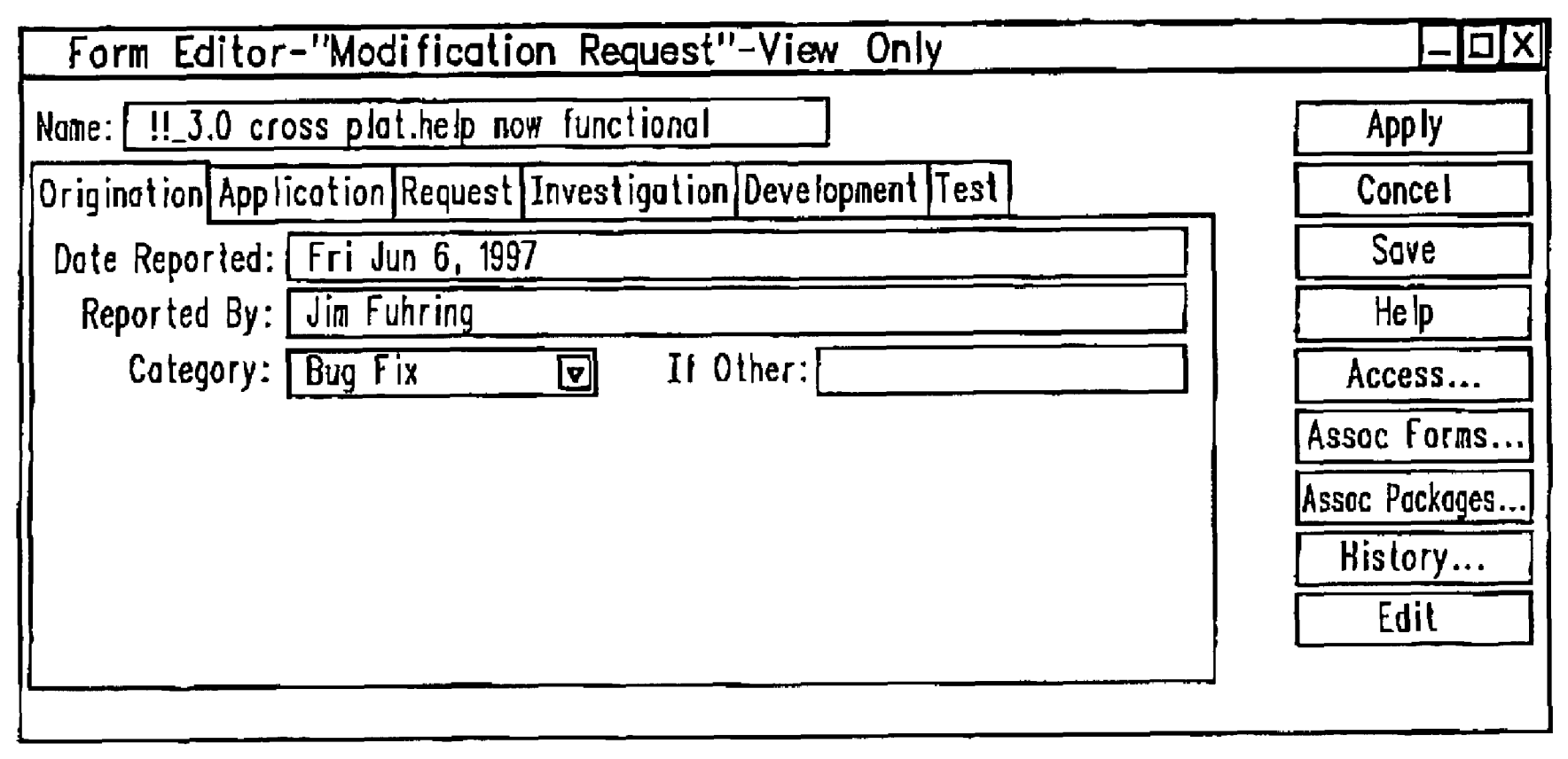
Figure 36G:
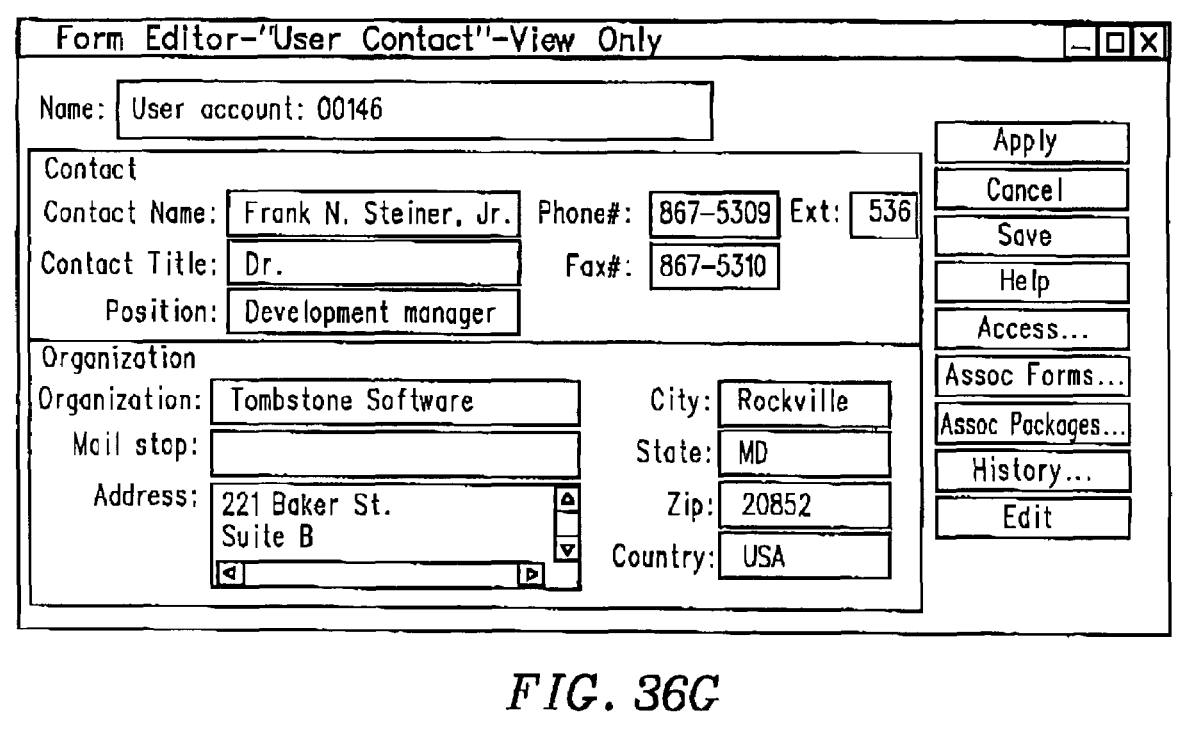
Figure 36H:
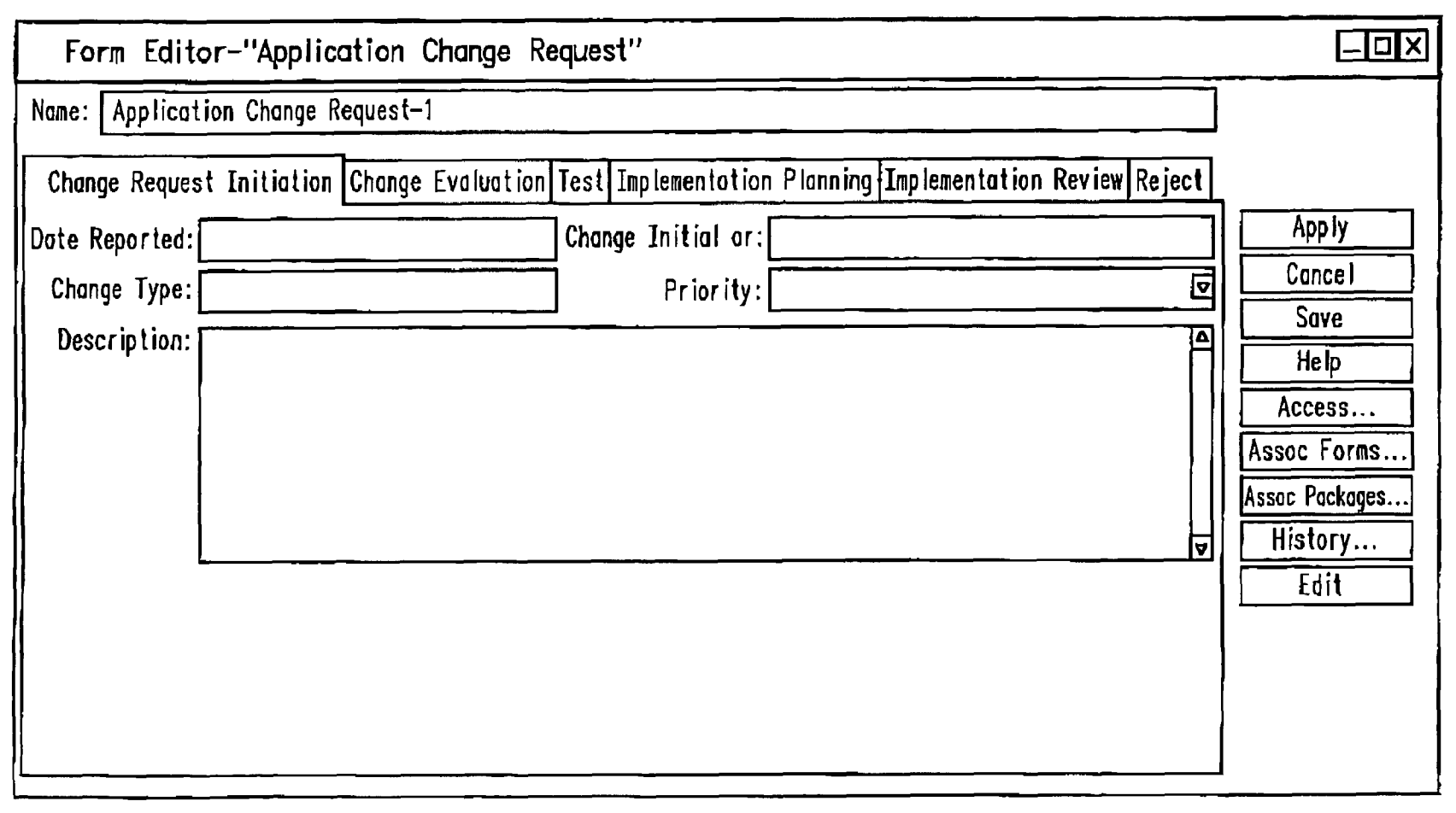
Figure 36I:
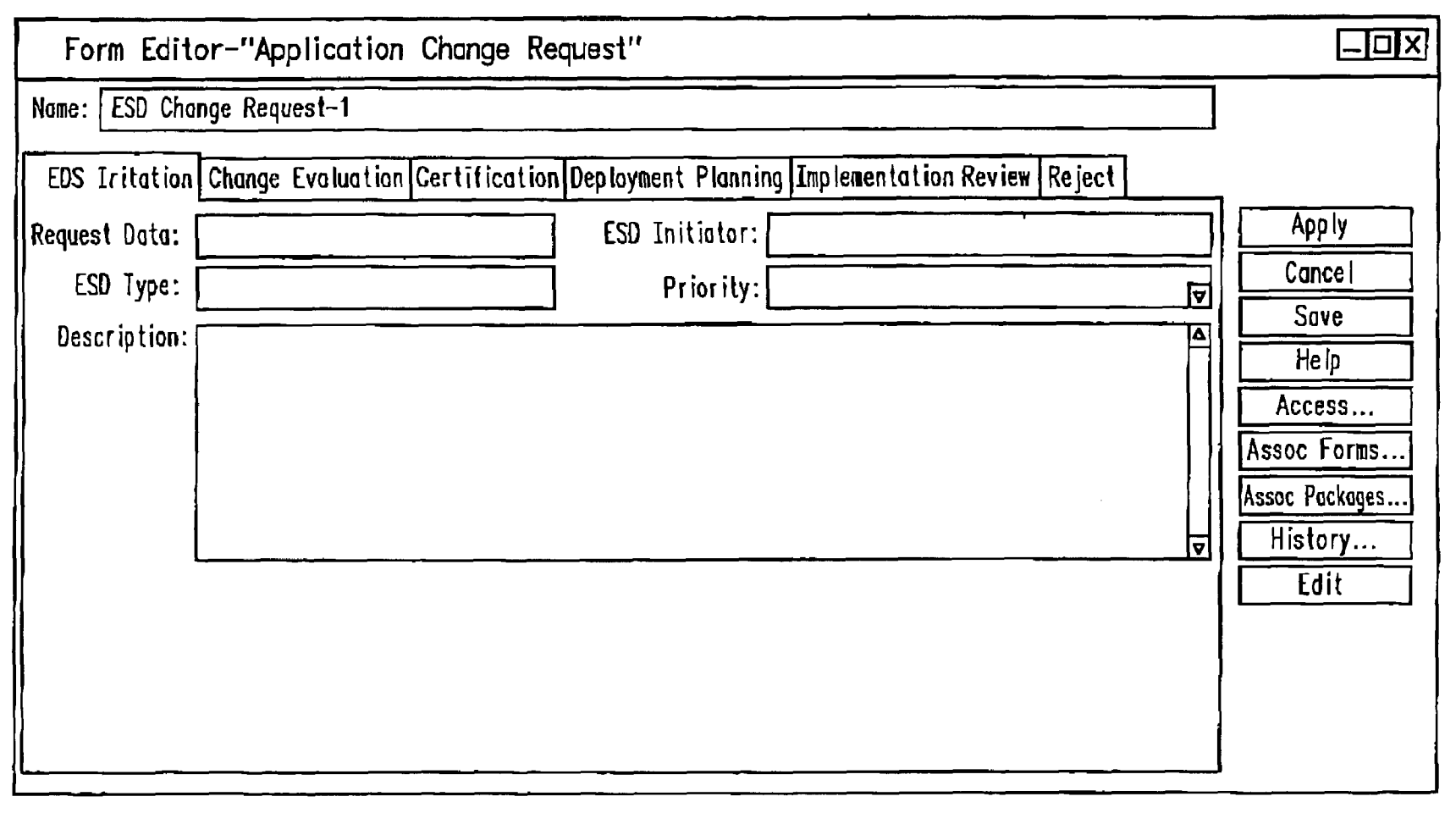

Forms represent a way of maintaining and organizing information within Harvest. Currently seven default forms are provided: Comment (see FIG. 36A), Defect Tracking (see FIG. 36B), Modification Request (see FIG. 36C), Problem Report (see FIG. 36D), Question & Answer (see FIG. 36E), Testing Information (see FIG. 36F), Application Change Request (see FIG. 36G), ESD Change Request (see FIG. 36H), and User Contact (see FIG. 36I). Users can also add additional customized form types with the Forms Customization Package (FCP) for Harvest.

Forms attain considerable usefulness through association with packages. This association allows a user to link a problem with the changes made to solve it. Forms can also be associated with other forms. This association can be used, for example, to link a User Contact form with a problem reported by that user.

The form object is global in scope; it does not belong to a particular environment, but can be used by any.

Form View

The form view is displayed then the user double-clicks on a form in the Harvest Explorer, or by locating a form by selecting Tools▶Find▶Forms. Forms can be accessed in these Harvest Explorer contexts:

If the user's context is at the environment level (no state specified), only forms associated with packages in this environment are displayed on the Harvest Explorer.

If the user's context is at the state level, only forms associated with packages in this environment currently located in this state are displayed on the Harvest Explorer.

If the form was defined previously, its current information is loaded into the form editor and can be modified. If it is new, values for the form fields can be specified with the editor. The Form Editor will be in the view only mode until File▶Edit Form or the Edit form toolbar button is selected. When the Form Editor is in the view only mode, changes cannot be made to the form.

All Form Editors look exactly the same, except for the actual form contents. The Modification Request Form Editor is illustrated in FIG. 26.

In the Name field, a label for the new form can be specified. The rest of the Form Editor contains the actual form fields. The default forms provided with Harvest are intended to be generic enough to be used in different scenarios. Fields can be left blank.

All fields in the Form Editor are case-sensitive, and information is stored exactly as it is input.

Creating a New Form

Figure 27:
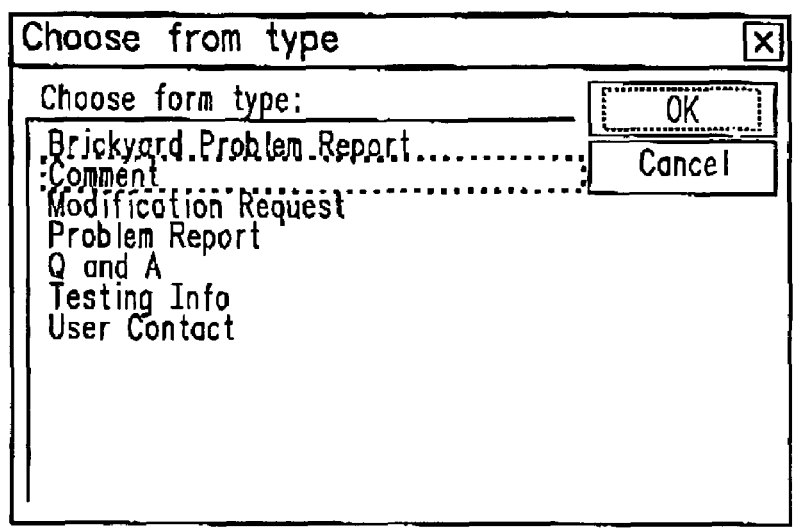
FIG. 27 is a screen snapshot of a Harvest Explorer Choose Form Type window.

To create a form, a user selects File▶New Form after selecting a Forms folder. This displays a form type chooser as illustrated in FIG. 27.

Each new form is based on an existing form type. The chooser displays the available form types: Comment, Defect Tracking, Modification Request, Problem Report, Q and A, Testing Info, and User Contact. If the user has added custom report types, they will also appear on the chooser. Select a form type by double-clicking on it or by highlighting it and clicking on the OK button.

This creates a new form named <form type>-<number>. The user can change this name by double-clicking on it to bring up the Form Editor.

The user can also duplicate an existing form by highlighting it and selecting Edit▶Duplicate. This creates a new form record named <object name>-<number>. The user can change this name by double-clicking on it to bring up the Form Editor. The content of the duplicated form is the same as the original form. In addition, all form associations are preserved for the duplicated form, as well as any access records set up for it.

Duplicating forms can provide a powerful shortcut for data entry. If the user creates a set of form templates and fills in information that will be shared among them, each new form created based on this template will automatically have these fields filled in correctly. To use forms as templates in this fashion, it is recommended that the user not have any form associations because these would be duplicated as well as the field contents. If the user wants only certain user groups to have access to certain forms, setting up the access correctly in a template can also shorten the form definition time.

Form Access Window

Figure 28:
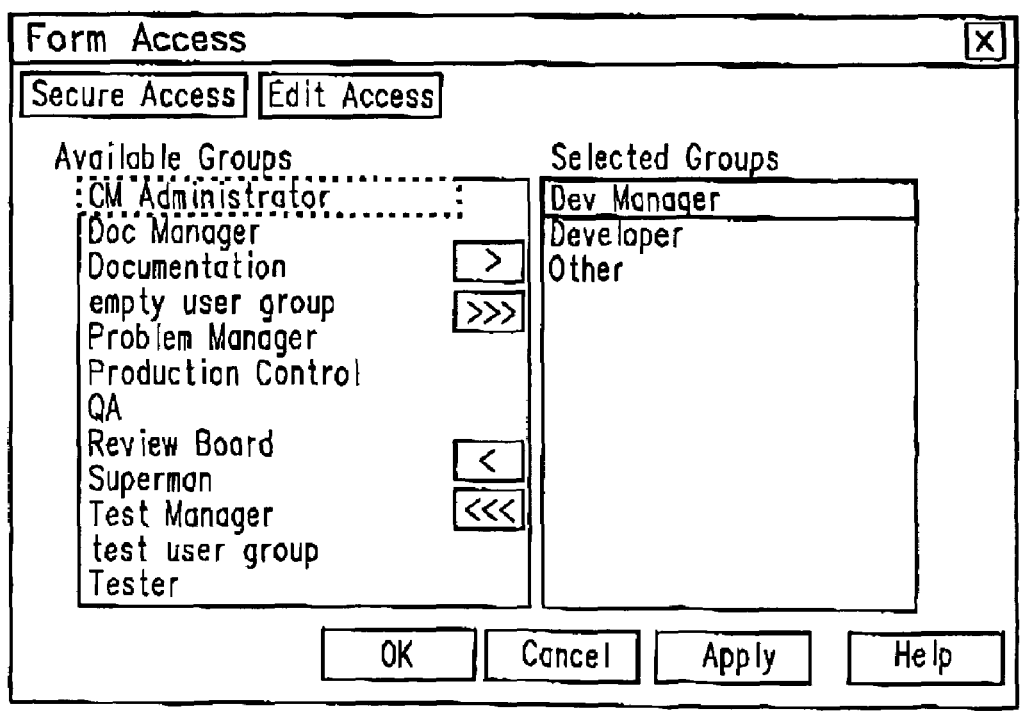
FIG. 28 is a screen snapshot of a Harvest Explorer Form Access window.

This window is displayed when Form▶Set access or the Set form access toolbar button on the Form Editor is selected (see FIG. 28). It allows the user to assign secure or edit access to the associated form. Users with secure access can specify who has access to edit the form. Users with edit access can modify the form attributes.

To give a user group access, either the Secure Access or the Edit Access method is selected and then a user group in the Available Groups list box is selected. Then, the left arrow button is clicked to move the group to the Selected Groups with Access list. A user may have access removed from a group in the same fashion.

Associated Forms

Figure 29:
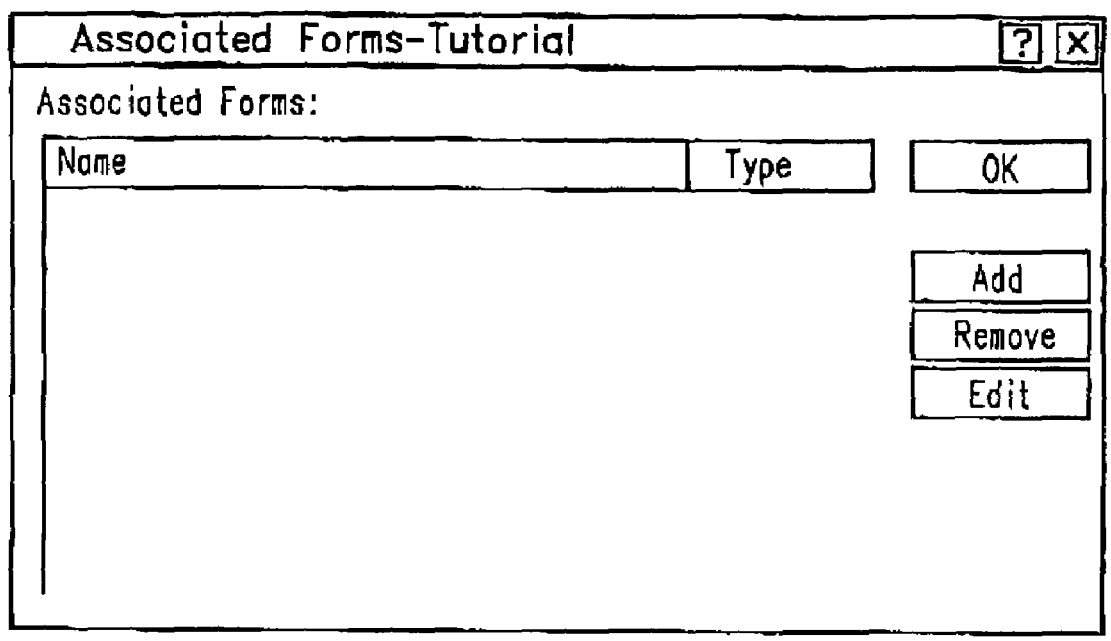
FIG. 29 is a screen snapshot of a Harvest Explorer Associated Forms window.

Each form can have other forms associated with it. Clicking on the Associated Forms button displays the Associated Forms window (see FIG. 29). This window displays a list of forms currently associated with the one being edited. From this window, the user can add forms to the list of associated forms or remove them from the list.

Clicking on the Name or Type column header on this window allows the user to sort the displayed forms by type or name.

The user can also execute one of the following functions:
OK. This closes the window and returns to the Form Editor.
Add. Clicking on this button displays the Form Chooser. A selection on the Form Chooser will be returned to this window and added to the list of forms associated with the one being edited.
Remove. If a form is selected in the window, the user can click on this button to remove it from the list of forms associated with the form currently being edited. This action does not actually delete the selected form, but just removes it from this list of associations.
Edit. This option is disabled when the Associated Forms window is invoked from the Form Editor. When this window is invoked from the Package Editor, the Edit button displays the Form Editor for the selected form.

Associated Packages

Figure 30:
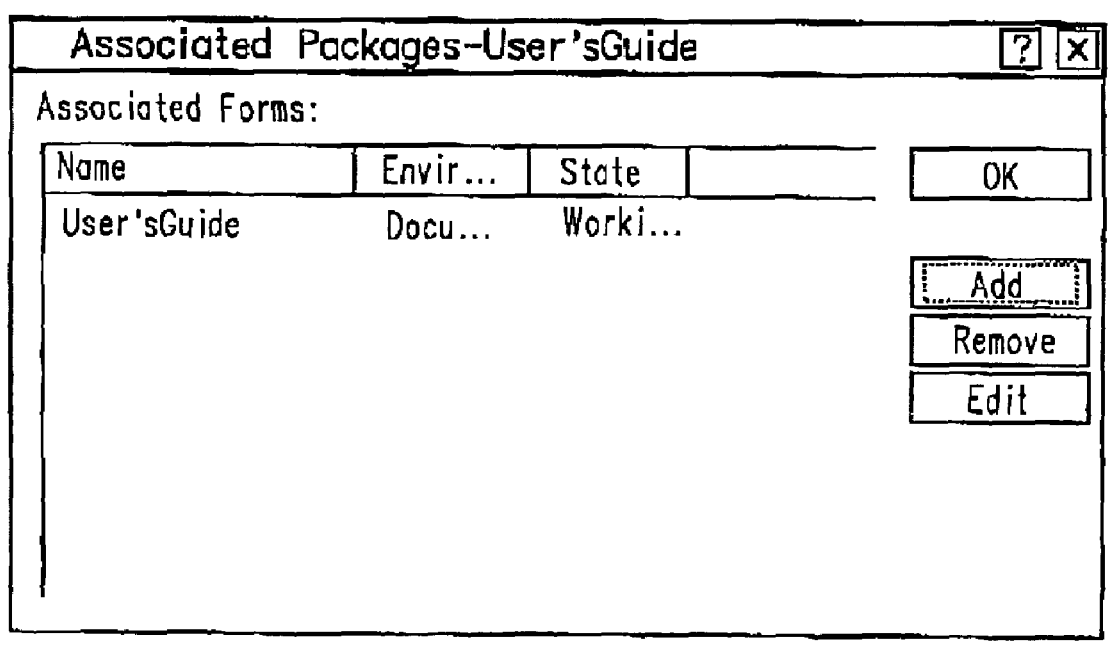
FIG. 30 is a screen snapshot of a Harvest Explorer Associated Packages window.

Each form can be associated with one or more packages. Clicking on the Associated Packages button displays the Associated Packages window (see FIG. 30). This window displays a list of packages currently associated with the form being edited. From this window, the user can associate more packages with the current form, remove packages from the list, or access the Package Editor for an associated package.

When this window is displayed, each package currently associated with the form being edited is listed. In addition to the package name, its associated environment and current state are displayed. On the Associated Packages window, the user can execute one of the following functions:
OK. This closes the window and returns to the Form Editor.
Add. Clicking on this button displays a Package Chooser that enables the user to select from all packages in Harvest. A Package Chooser selection will be returned to the Associated Packages window and added to the list of packages associated with the form being edited.
Remove. If a package is selected in the window, the user can click on this button to remove it from the list of packages associated with the form being edited. This action does not actually delete the selected package, but just removes it from this list of associations.
Edit. If a package is selected in the window, the user can click on this button to invoke the Package Editor for this package. This will allow the user to review or change the definition for the associated package.

Form History

Figure 31:
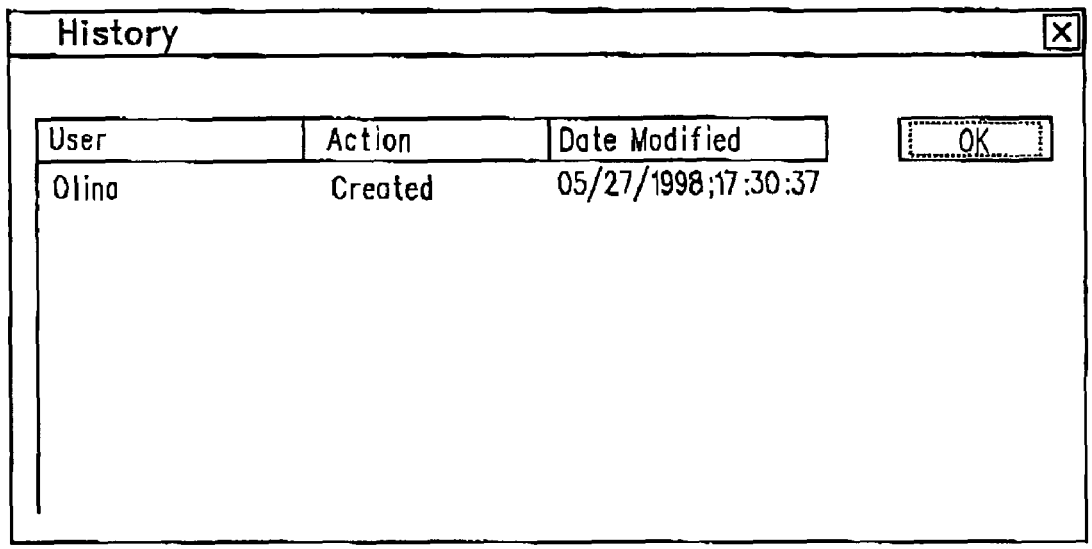
FIG. 31 is a screen snapshot of a Harvest Explorer Form History window.

Clicking on the Show form history toolbar button displays the Form History window (see FIG. 31). This window displays the modification history for the form being edited.

The Form History window includes the OK button which returns the user to the Form Editor. A record is added to this history when a form is created or duplicated, its field contents are modified, its associations are modified, or its access is modified.

The Form Chooser

The Form Chooser allows the user to execute complex filtering operations to locate forms with common attributes. This information can be sent to the log view, from which it can be printed, copied, or saved.

The various options on this chooser work in conjunction with one another to allow the user to select particular forms according to multiple criteria. The Form Chooser (see FIG. 33) has two tab pages used to set filters: Name and Location, and Form. Clicking on the tab brings that page to the forefront.

When the Form Chooser is initially displayed, its list box is empty. The user must press the Find Now button for the current filtering options to take effect. Because the previous filtering criteria might not be relevant to the operation, the user now wants to perform, this implementation prevents the user from having to wait to receive data from the server when the chooser is invoked. Once Find Now is pressed, the forms matching the filtering criteria are displayed and selected in the list box.

The various options on this chooser work in conjunction with one another to allow the user to specify which forms should be displayed on the Harvest Explorer.

Name and Location Page

Figure 32:
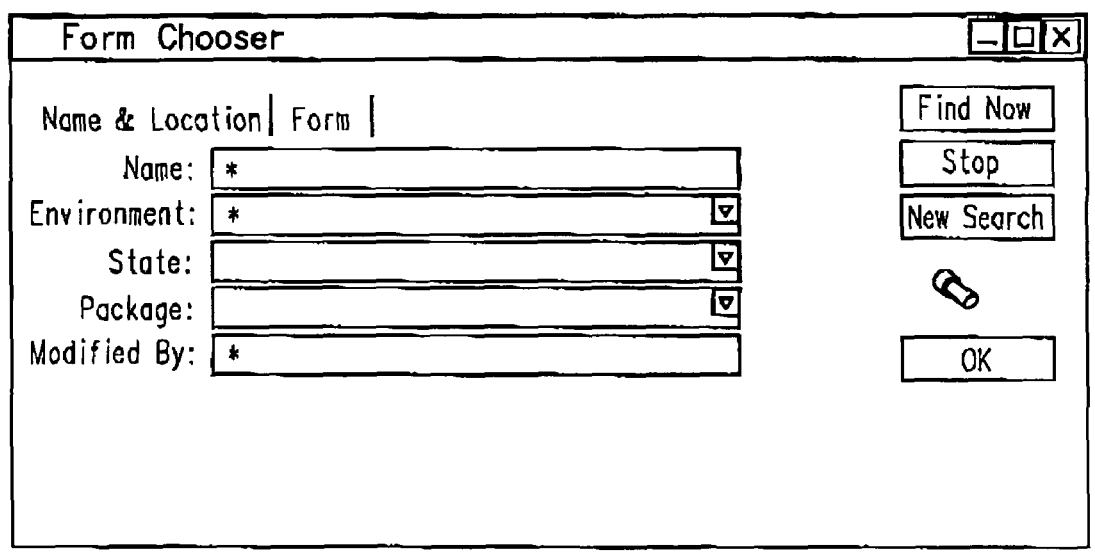
FIG. 32 is a screen snapshot of a Harvest Explorer Form Chooser Name & Location page.

The Name and Location page allows the user to select what forms to search for and in what environment, state, and package to search (see FIG. 32). The user can also search for a form modified by a specific user. The Harvest Explorer selection creates the default environment and state.

Name

The Name field allows the user to filter forms according to a naming pattern. If the user leaves the Name field blank, forms are displayed regardless of name. Any number of wild cards (*) in any position can be used for multiple character matching. The use of the question mark (?) is also supported for single character matching. The Name field is not case-sensitive. Entering N* will display forms whose names begin with N or n.

Environment

The user can filter on an environment by using the Environment option menu. This menu lists all of the environments that the user can search. When the environment context has been established on the Harvest Explorer, the Environment box shows that context.

State

The user can filter on a state by using the State option menu. This menu lists all of the valid states for the current environment. When the state context has been established on the Harvest Explorer, the State box shows that context.

Package

The Package field allows the user to search for a form in a specific package. A click on the browse button brings up the Select a Package window. This window lists the packages in the current environment and state; the user can choose a package, then click OK to select it. Wild card searches are allowed. The default is the wild card (*).

Modified By

This field allows the user to filter forms based on the name of the user who last modified (or created) them. A click on the browse button brings up the Select a User window. This window lists the users who have access to the current environment. The user can choose a user, then click OK to select it. Wild card searches are allowed. The default is the wild card (*)

Form Page

Form Type

The Form Type pull-down menu allows the user to specify what kind of form will be displayed. Selecting the form type causes only forms that are of the specified type to be displayed on the chooser. The user is also able to query on the various fields of the specified form type. The Harvest Explorer has these seven form types: Comment, Defect Tracking, Modification Request, Problem Report, Q and A, Testing Info, and User Contact. The user can also use the wild card (*) to search for all forms of any type to be displayed on the chooser. If the user has added customized form types to Harvest, the custom form types will also appear on the pull-down menu.

Form Fields

Figure 33:
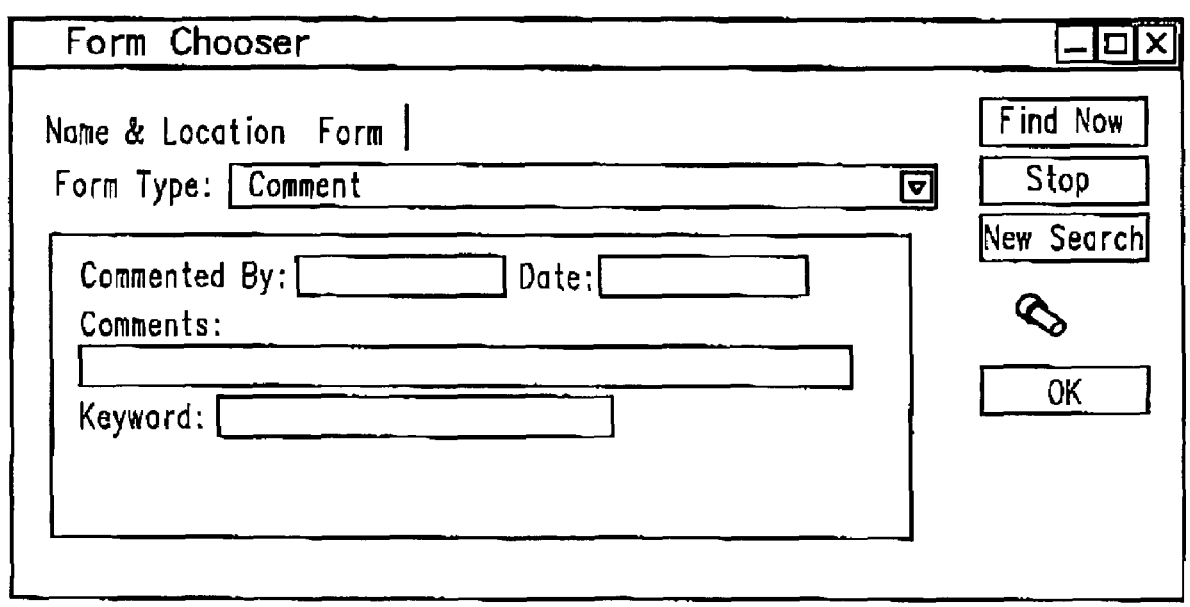
FIG. 33 is a screen snapshot of a Harvest Explorer Form Chooser Form page.

If the user specifies a form type, the fields on that form type become available for use as filters. FIG. 33 shows how the Form Chooser appears when Comment is selected for the form type.

When filtering by Comment, all of the fields of the Comment form now appear on the Form Chooser. The user can enter a value in any field to include only forms with that value in the current filtering operation. This feature provides a powerful querying mechanism that allows the user to search and find exactly matching information. For example, the user could enter Sun in the Keyword field to locate all comments that have been reported regarding the Sun hardware platform.

The user need not know the precise value for a field to use it as a filter. Asterisks (*) in any field provide for wild card matching. For example, the user might want to search for all Comments that mention performance anywhere in the Comments field. To do this, simply enter *performance* in the Comments field. Harvest will return all matching Comment forms in the Form Chooser's list box.

In one embodiment, only trailing wild cards are used in short text fields such as Category and Hardware on the Problem Report Form. For longer fields such as Problem Description, any number of wild cards (*) in any position can be used for multiple character matching. The question mark (?) is also supported for single character matching.

Form fields in the Form Chooser are not case-sensitive. This allows users to query for form information regardless of the case of the data entered in the Form Editor.

Valid Date Formats

When inputting or searching for date information, the user should be aware of restrictions, such as a date format field that only accepts certain formats and validates the user input against them. Any formats may be utilized, however, in Harvest Explorer the accepted formats are:

7/2/96

07/02/96

7/2

07/02

Jul 2, 1996

Sat Jul 2, 1996

*mm*

*dd*

*yyyy*

Valid month and day abbreviations consist of the first three characters of the month or day name.

State Processes

During the setup of an environment, processes are defined that can be invoked and executed in a state. These processes are displayed as options on the Processes pull-down and right-click menus of the Harvest Explorer, and the Process menu of the Version Chooser.

Each process must belong to one of Harvest's predefined types: approve, check in, check out, concurrent merge, create package, cross-environment merge, delete versions, demote, interactive merge, list difference, list version, notify, promote, remove item, and user-defined (UDP). The exact name for each process is user-definable.

The default values that appear on the process windows were defined by means of the process editor during setup. This means that the window's initial appearance varies, depending on how it has been set up by the administrator. Each user can override the defaults.

Executing Processes

The user can select a process to execute from the Harvest Explorer, after establishing a context (at the state level), by:

the right-click on a package selecting a package then choosing Processes▶Process name from the Harvest Explorer menu.

By choosing Tools▶Find▶Versions . . . from the Harvest Explorer menu. This opens the Version Chooser which enables the user to filter for items, associate packages, set context, and select a process to execute.

By dragging client directory files from the Windows Explorer to the check in process window.

Select File▶Check in to open the check in window, select the client directory files on the Windows Explorer, drag them to the check in process window, and drop them in the file list. The user can then execute the check in. This means that the user can use the Windows Explorer for making check in selection and bypass the choosers.

Web Interface

The present invention includes a Web interface which will allow Internet browsers such as Internet Explorer and Netscape to perform some Harvest tasks. In one embodiment, the Web interface enables reporting on Package Lists, Items and Change History. In addition Promote, Demote and Approve Packages are also accessible via the Web interface.

Figure 34:
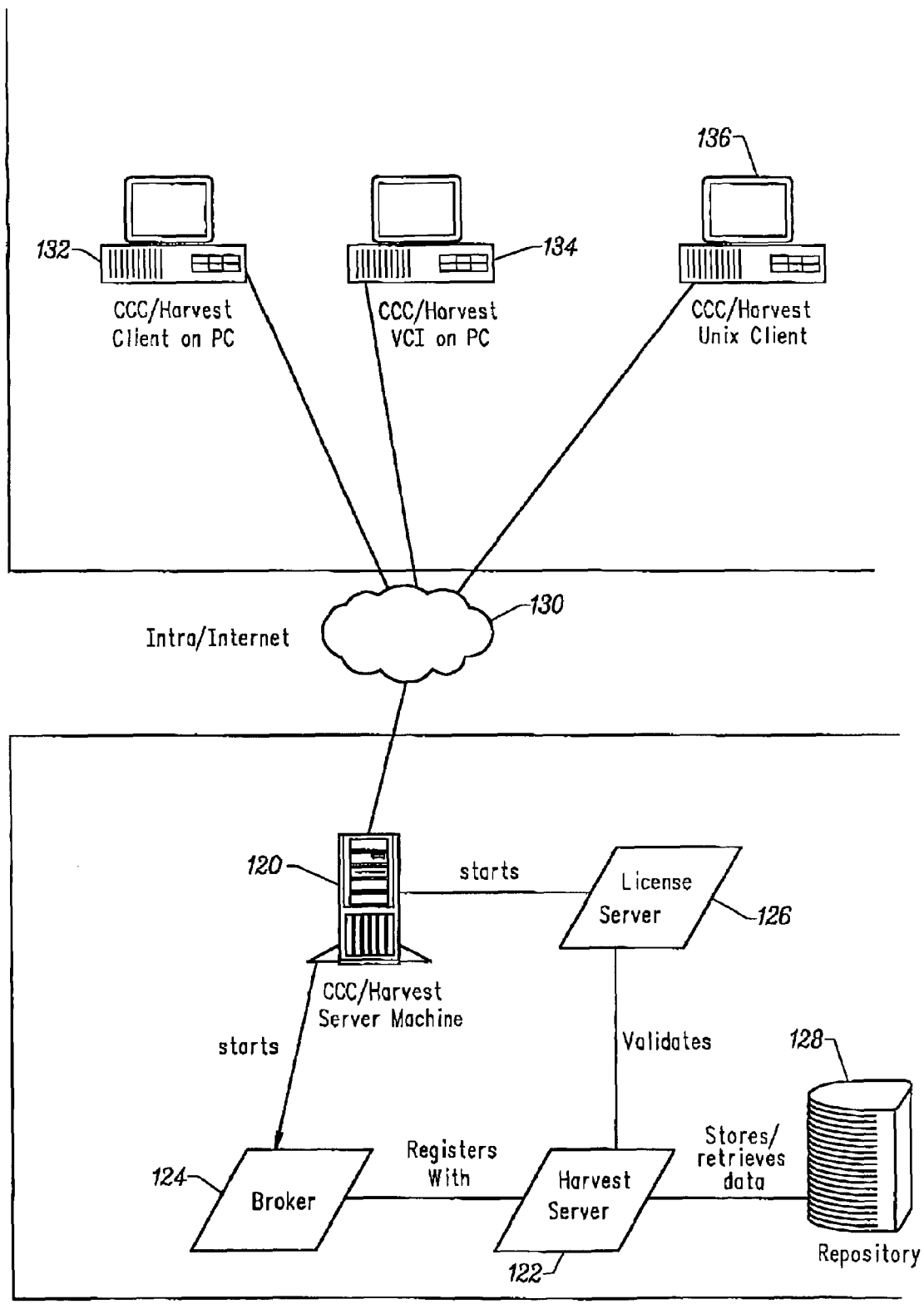
FIG. 34 is a block diagram of a Harvest Explorer Web Interface including a Harvest Explorer Server Machine and remote computers.

FIG. 34 is a block diagram illustrating the basic components of a Web interface connected across one of the Internet and an intranet.

In FIG. 34, a Harvest server machine 120 executes a Harvest server program 122 and various related processes such as broker 124, and license server 126 needed to allow proper functioning of the Harvest server 122. The Harvest server 122 stores and retrieves data from a repository 128 and is configured to perform configuration management functions on objects within the configuration management system implemented by the Harvest server in accordance with the above disclosure. The Harvest server machine 120 is connected to an outside network, in this case labeled Intra/Internet 130 and is of the form of either one of a worldwide or wide area network such as the Internet and a local intranet. As such, Harvest Explorer is connected to one or more remote computers, and is shown in FIG. 34, including PC client 132, VCI on a PC 134, and a UNIX client 136, for example. Other computers capable of operating appropriate Web browsers and related Internet type software may also be connected to the Intra/Internet 130 and access the Harvest Server.

Data transmitted from the server machine 120 across the intra/internet 130 and to the remote computers can be of any form in which to transmit representations of objects within the configuration management system as described above and to convey instructions such as the invocation of configuration management functions between the remote computer and the server machine 120. For example, the Harvest server machine 120 may produce an HTML document showing icons of objects within the configuration management system in accordance with the above disclosure, and allow for invocation of various configuration management functions as discussed above via menu selection accessible through the HTML document provided.

Alternatively, object representations and facilities for invocation of configuration management functions may also be implemented as any one of an active X component, Visual Java, Java Applet, or PERL programming techniques. Various security features would also be in place and run on the server machine 120 to prevent unauthorized access from outside users across the Intra/Internet 130.

Harvest Use Example

The following actors are the general intended users of the Harvest Explorer.

Support Administrator—This person takes information from support and customers and enters defects of packages as part of a continuous process improvement strategy. This person may check the status of packages, enter new packages, filling in forms with problems and enhancement requests.

Developer—This person is the backbone of the organization that actually makes changes on file items and may decide validity of packages. This person is also responsible for unit testing code changes.

Development Manager—This person is a coordinator for development, taking care to make sure packages work in their respective ways through the software life cycle.

Test/QA Reviewer—This person has the responsibility to check system integration, making sure all components work as desired.

Figure 35:
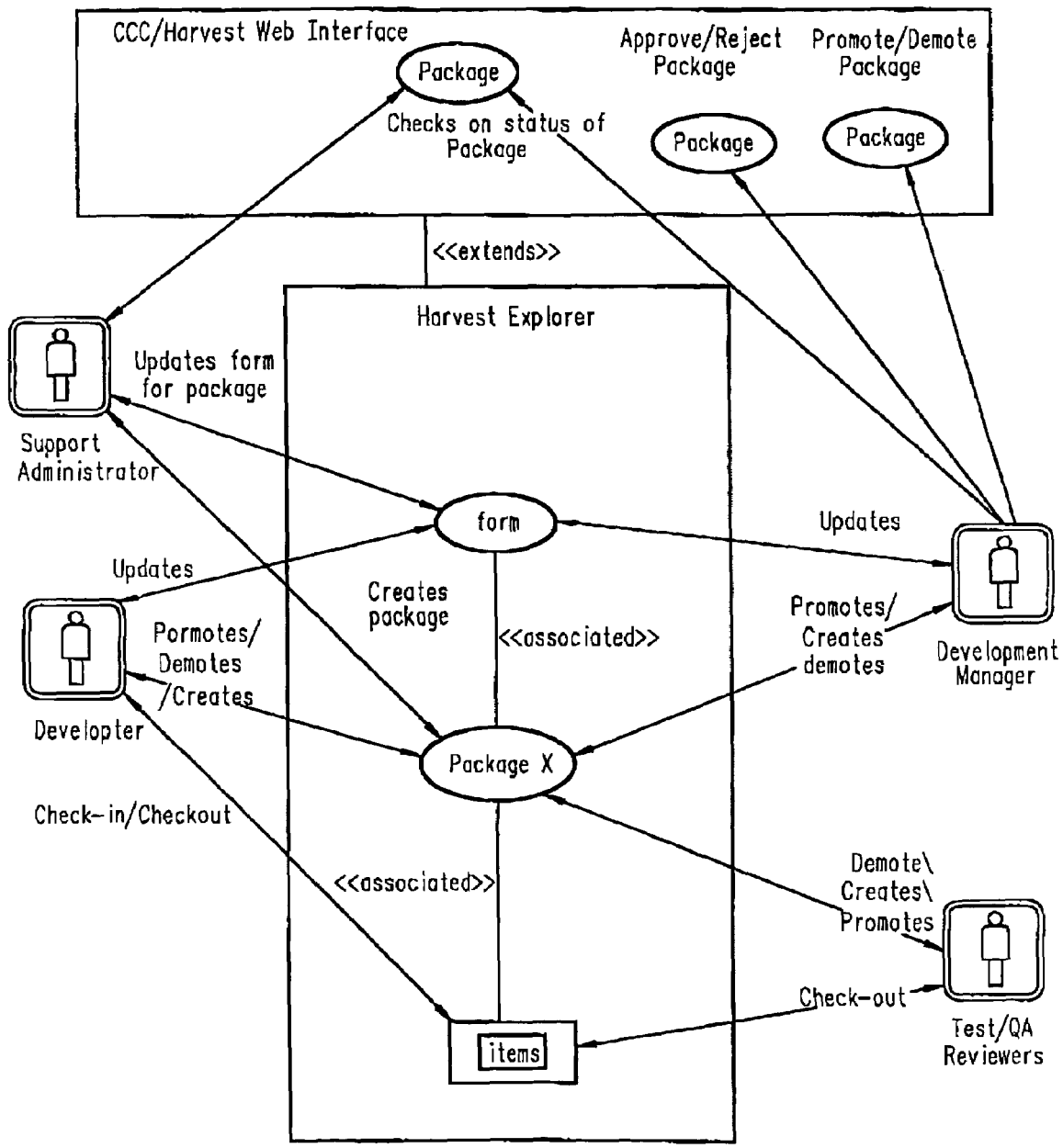
FIG. 35 is a diagram of interactions between users of the Harvest Explorer.

FIG. 35 is a flow diagram illustrating the flow of packages between the above actors (Support Administrator, Developer, Development Manager, Test/QA Reviewer) in conjunction with the Harvest Explorer.

A scenario illustrating the use of Harvest Explorer begins with the Support Administrator getting e-mail from a customer on the behavior of software. The support administrator successfully reproduces the error as described in the e-mail from the customer. The Support Administrator then creates a package in the new issue state using the Harvest Explorer. The Support Administrator also updates the form associated with the newly created package (called "X").

The Development Manager gets an e-mail from a post-process that a package has been created in the new issue state. The Development Manager then promotes package X to the under review state. The Support Administrator receives e-mail that his package has been promoted to under review, or he may periodically check the status of the package via the Web interface. In one embodiment, E-mails for announcing the existence or change of state of any particular package or object within the Harvest system may be automatically generated and sent to appropriate personnel.

The Development Manager upon further investigation may determine that the package is 1) invalid and demoted, 2) deferred and demoted, 3) duplicate and demoted; and 4) valid and promoted. Other determinations may also be appropriate effecting either the demotion or promotion of a package or object. Each movement is preceded by the Development Manager filling out a form associated with the package X.

The Developer gets notification that a package has been promoted to Development and that she is responsible for preparing it. After examining the package, she may also promote it, or may design a fix for the defect. Upon completion of the design, the design document will be checked and the package will be promoted. Once the design review is complete, the package may either be demoted or be reworked, or promoted. Thus, Harvest Explorer provides all the functionality of the advanced configuration management system and does so in utilizing the advanced GUI environment described herein to improve the overall usability of the product and associated configuration management functions. This invention may be conveniently implemented using a conventional general purpose digital computer or microprocessor programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The computer program product may be prepared to run on a selected of any number of specialized or general purpose computers. Stored on any one of the computer readable media, the present invention includes software for controlling both the hardware of the selected computer and for enabling the selected computer to interact with a human user. Such software may include, but is not limited to, device drivers, operating systems and user applications, such as development tools.

Included in the programming of the selected computer are software modules for implementing the teachings of the present invention including but not limited to manipulation of digital images including the list boxes, buttons and scroll bars of graphical user interfaces (GUIs), and for the identification, indexing and storage of objects maintained according to the teachings of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A configuration management system, comprising:
a configuration device configured to perform configuration management functions on objects within said configuration management system, the objects comprising items that are associated with the development of a product, the configuration device operable to receive, from a user, configuration input related to at least one object and effect a change in the development of the product based on the user input;
a display device configured to display a representation of said objects in a presentation having a tree display of objects in said configuration management system and a content display that displays items selected in said tree display;
a server machine for executing said configuration device and producing display information for said representation of said objects within said configuration management system; and
a network interface connecting said server machine to a network, wherein said network interface is a web interface and said network is one of the Internet and an intranet, wherein said server machine transmits information produced by said configuration device and said display information over said network for display on a remote computer, wherein the transmitted information includes one of an Active X component, Visual Java program, Java applet, and PERL program configured to utilize the information produced by said configuration device in said presentation.

2. The configuration management system according to claim 1, wherein said one of an Active X component, Visual Java Program, Java applet, and PERL program are further configured to provide access to selected of said configuration management functions.

3. The configuration management system according to claim 2, wherein said selected configuration management functions include at least one of object state changes, object check-in, object check-out, create package, difference of disparate objects, move package, promote package, demote package, snapshot, approve, list version, list difference, remove item, notify, concurrent merge, cross environment verge, interactive merge, execute user defined process (UDP); and
said state changes are performed by drag and drop procedures utilizing said representation of said objects.

4. A configuration management system, comprising:
a configuration device configured to perform configuration management functions on objects within said configuration management system, the objects comprising items that are associated with the development of a product, the configuration device operable to receive, from a user, configuration input related to at least one selected object;
a display device configured to display a representation of said objects in a presentation having a tree display of objects in said configuration management system, and a content display that displays items selected in said tree display;
a server machine for executing said configuration device and producing display information for said representation of said objects within said configuration management system;
a network interface connecting said server machine to a network, wherein said network interface is a web interface and said network is one of the Internet and an intranet, wherein
said server machine transmits information produced by said configuration device and said display information over said network for display on a remote computer; and
a report generator configured to produce, in response to the configuration input received from the user, at least one of access reports, version control reports, and package based reports based on at least one selected of said objects, wherein each of said reports generated by said report generator are formatted as HTML documents and sent via said network interface by said server machine for display on said remote computer.

5. The configuration management system according to claim 4, wherein said report generator generates: said access reports when the selected object is one of a user group, object, and environment;
said package based reports when the selected object is a package; and
said version control reports when the selected object is a package.

6. The configuration management system according to claim 5, wherein said report generator is configured to produce said reports in InfoReport report formats.

7. The configuration management system according to claim 5, wherein:
said access reports include information indicating which users and user groups have access to execute specified functions in an environment;
said version control reports include a list of items organized by at least one of version, check out parameters, branches, modification by user, modification by environment, and current release; and
said package based reports include a list of items organized by at least one of items modified by packages, packages by state, time in state, and packages by form items.

8. A method of interacting with a configuration management system, comprising the steps of:
managing performance of configuration management functions on objects within said configuration management system, the objects comprising items that are associated with the development of a product;
displaying a representation of said objects in a presentation having a tree display of objects in said configuration management system, and a content display that displays items selected in said tree display;
executing said configuration management system on a server machine in order to produce display information for said representation of said objects within said configuration management system;

connecting said server machine to a network via a network interface, wherein said network interface is a web interface and said network is one of the Internet and an intranet;

transmitting said display information produced by said configuration management system over said network for display on a remote computer;

formatting said display information as at least one of an Active X component, Visual Java program, Java applet, and PERL program configured to produce said presentation; and receiving, from a user of the remote computer, configuration input related to at least one object and effecting a change in the development of the product based on the configuration input.

9. The method according to claim 8, wherein said one of an Active X component, Visual Java Program, Java applet, and PERL program are further configured to provide access to selected of said configuration management functions.

10. The method according to claim 9, wherein:

said selected configuration management functions include at least one of object state changes, object check-in, object check-out, create package, difference of disparate objects, move package, promote package, demote package, snapshot, approve, list version, list difference, remove item, notify, concurrent merge, cross environment verge, interactive merge, execute user defined process (UDP); and said method further comprises the step of:

performing said state changes by drag and drop procedures utilizing said representation of said objects.

11. A method of interacting with a configuration management system, comprising the steps of:

managing performance of configuration management functions on objects within said configuration management system, the objects comprising items that are associated with the development of a product;

displaying a representation of said objects in a presentation having a tree display of objects in said configuration management system, and a content display that displays items selected in said tree display;

executing said configuration management system on a server machine in order to produce display information for said representation of said objects within said configuration management system;

connecting said server machine to a network via a network interface, wherein said network interface is a web interface and said network is one of the Internet and an intranet;

transmitting said display information produced by said configuration management system over said network for display on a remote computer;

receiving, from a user of the remote computer, configuration input related to at least one selected object and generating at least one of access reports, version control reports, and package based reports in response to the configuration input; and formatting said reports generated as HTML documents and sent via said network by said server machine for display on said remote computer.

12. The method according to claim 11, wherein said step of generating comprises the steps of:

producing said access reports when the selected object is one of a user group, object, and environment;

producing said package based reports when the selected object is a package; and producing said version control reports when the selected object is a package.

13. The method according to claim 12, wherein said report generator is configured to produce said reports in InfoReport report formats.

14. The method according to claim 12, wherein:

said step of producing said access reports includes the step of indicating which users and user groups have access to execute specified functions in an environment;

said step of producing said version control reports includes organizing a list of items by at least one of version, check out parameters, branches, modification by user, modification by environment, and current release; and said step of producing said package based reports includes organizing a list of items by at least one of items modified by packages, packages by state, time in state, and packages by form items.

15. A computer readable medium having computer instructions stored thereon that, when loaded into a computer, cause the computer to perform the steps of:

managing performance of configuration management functions on objects within a configuration management system, the objects comprising items that are associated with the development of a product;

displaying a representation of said objects in a presentation having a tree display of objects in said configuration management system, and a content display that displays items selected in said tree display;

executing said configuration management system on a server machine in order to produce display information for said representation of said objects within said configuration management system;

connecting said server machine to a network via a network interface, wherein said network interface is a web interface and said network is one of the Internet and an intranet;

transmitting said display information produced by said configuration management system over said network for display on a remote computer;

formatting said display information as at least one of an Active X component, Visual Java program, Java applet, and PERL program configured to produce said presentation; and receiving, from a user of the remote computer, configuration input related to at least one selected object and effecting a change in the development of the product based on the configuration input.

16. The computer readable medium according to claim 15, wherein said one of an Active X component, Visual Java Program, Java applet, and PERL program are further configured to provide access to selected of said configuration management functions.

17. The computer readable medium according to claim 16, wherein:

said selected configuration management functions include at least one of object state changes, object check-in, object check-out, create package, difference of disparate objects, move package, promote package, demote package, snapshot, approve, list version, list difference, remove item, notify, concurrent merge, cross environment verge, interactive merge, execute user defined process (UDP); and said instructions stored thereon further cause the computer to perform the step of:

performing said state changes by drag and drop procedures utilizing said representation of said objects.

18. A computer readable medium having computer instructions stored thereon that, when loaded into a computer, cause the computer to perform the steps of:

managing performance of configuration management functions on objects within a configuration management system, the objects comprising items that are associated with the development of a product;

displaying a representation of said objects in a presentation having a tree display of objects in said configuration management system, and a content display that displays items selected in said tree display;

executing said configuration management system on a server machine in order to produce display information for said representation of said objects within said configuration management system;

connecting said server machine to a network via a network interface, wherein said network interface is a web interface and said network is one of the Internet and an intranet;

transmitting said display information produced by said configuration management system over said network for display on a remote computer;

receiving, from a user of a remote computer, configuration input related to at least one selected object and generating at least one of access reports, version control reports, and package based reports in response to the configuration input; and formatting said reports generated as HTML documents and sent via said network by said server machine for display on said remote computer.

19. The computer readable medium according to claim 18, wherein said step of generating comprises the steps of:

producing said access reports when the selected object is one of a user group, object, and environment;

producing said package based reports when the selected object is a package; and producing said version control reports when the selected object is a package.

20. The computer readable medium according to claim 19, wherein said report generator is configured to produce said reports in InfoReport report formats.

21. The computer readable medium according to claim 19, wherein:

said step of producing said access reports includes the step of indicating which users and user groups have access to execute specified functions in an environment;

said step of producing said version control reports includes organizing a list of items by at least one of version, check out parameters, branches, modification by user, modification by environment, and current release; and said step of producing said package based reports includes organizing a list of items by at least one of items modified by packages, packages by state, time in state, and packages by form items.

22. A configuration management system, comprising:

means for performing configuration management functions on objects within said configuration management system, the objects comprising items that are associated with the development of a product;

means for displaying a representation of said objects in a presentation having a tree display of objects in said configuration management system, and a content display that displays items selected in said tree display;

means for connecting said means for performing configuration management functions to a network via a network interface, wherein said network interface is a web interface and said network is one of the Internet and an intranet;

means for transmitting information produced by said means for performing configuration management functions over said network for display on a remote computer;

means for formatting the information transmitted as one of an Active X component, Visual Java program, Java applet, and PERL program configured to utilize the information; and means for receiving, from a user of the remote computer, configuration input related to at least one object and effecting a change in the development of the product based on the configuration input.

23. A configuration management system, comprising:

means for performing configuration management functions on objects within said configuration management system, the objects comprising items that are associated with the development of a product;

means for displaying a representation of said objects in a presentation having a tree display of objects in said configuration management system, and a content display that displays items selected in said tree display:

means for executing said configuration management system on a server machine in order to produce display information for said representation of said objects within said configuration management system;

means for connecting said server machine to a network via a network interface, wherein said network interface is a web interface and said network is one of the Internet and intranet;

means for transmitting said display information produced by said configuration management system over said network for display on a remote computer;

means for receiving, from a user of a remote computer, configuration input related to at least one selected object; and means for generating at least one of access reports, version control reports and package based reports, in response to the configuration input received from the user, based on at least one selected of said objects within said configuration management system.

24. The configuration management system according to claim 23, wherein said means for generating comprises:

means for producing said access reports when the selected object is one of a user group, object, and environment;

means for producing said package based reports when the selected object is a package; and means for producing said version control reports when the selected object is a package.

* * * * *